United States Patent
Kuang et al.

(10) Patent No.: US 9,166,975 B2
(45) Date of Patent: *Oct. 20, 2015

(54) SYSTEM AND METHOD FOR SECURE REMOTE ACCESS TO A SERVICE ON A SERVER COMPUTER

(71) Applicant: INBAY TECHNOLOGIES INC., Kanata (CA)

(72) Inventors: Randy Kuang, Kanata (CA); Stanislus Kisito Xavier, Kanata (CA); Robert Frank Steklasa, Ottawa (CA); Stephen George Wilson, Ottawa (CA); He Zhu, Ottawa (CA)

(73) Assignee: INBAY TECHNOLOGIES INC., Kanata, Ontario ( * ) Notice: Subject to any disclaimer, the term of this patent is extended or adjusted under 35 U.S.C. 154(b) by 0 days.

This patent is subject to a terminal disclaimer.

(21) Appl. No.: 14/309,369

(22) Filed: Jun. 19, 2014

(65) Prior Publication Data

US 2014/0304780 A1    Oct. 9, 2014

Related U.S. Application Data

(63) Continuation-in-part of application No. 14/231,545, filed on Mar. 31, 2014, which is a continuation of application No. 13/765,049, filed on Feb. 12, 2013, now Pat. No. 8,739,252.

(60) Provisional application No. 61/839,218, filed on Jun. 25, 2013, provisional application No. 61/599,556, filed on Feb. 16, 2012.

(51) Int. Cl.
*H04L 29/06* (2006.01)

(52) U.S. Cl.
CPC ............ *H04L 63/0838* (2013.01); *H04L 63/06* (2013.01); *H04L 63/0853* (2013.01); *H04L 63/168* (2013.01); *H04L 2463/062* (2013.01)

(58) Field of Classification Search
CPC ... H04L 63/06; H04L 63/0836; H04L 63/062; H04L 63/168; H04L 63/0853
USPC .......................................................... 726/4
See application file for complete search history.

(56) References Cited

U.S. PATENT DOCUMENTS 7,363,494 B2   4/2008   Brainard et al.
7,475,247 B2   1/2009   Bade et al.
(Continued)

FOREIGN PATENT DOCUMENTS

WO   2007026228   3/2007
WO   WO2008024454   2/2008

OTHER PUBLICATIONS http://www.asseco-see.com/nbv5/images/stories/presentations/NBV%20Authentication.pdf, presented during "New Banking Vision 5" from May 25-28 in Hotel "Sol Coral" Umag, Croatia.
(Continued)

*Primary Examiner* — Kambiz Zand
*Assistant Examiner* — Benjamin Kaplan
(74) *Attorney, Agent, or Firm* — IP-MEX Inc.; Victoria Donnelly

(57) ABSTRACT

System and method for providing access to remote computing services in an application server are described, where the authentication and authorization processes are separated, excluding service access privileges from the authenticating process and transferring the privileges to the authorization process. A client device and a user are authenticated, and upon successful authentication, the authorization process is performed, including establishing an authorization connection between the client device and the server computer; at the server computer, detecting and verifying the authorization connection; and upon successful verification, allowing access of the client device to the service on the server computer. In one embodiment, upon detecting the authorization connection, a blocking process is created to block access to the service; and, upon successful verification of the authorization connection, the blocking process on the server computer is terminated, prior to the allowing the access of the client device to the service on the server computer.

34 Claims, 32 Drawing Sheets

(56) References Cited

U.S. PATENT DOCUMENTS

| | | |
|---|---|---|
| 7,502,933 B2 | 3/2009 | Jakobsson et al. |
| 7,516,483 B2 | 4/2009 | Brennan |
| 7,562,385 B2 | 7/2009 | Thione et al. |
| 7,565,536 B2 | 7/2009 | Vassilev et al. |
| 7,912,916 B2 | 3/2011 | Rakowski et al. |
| 7,925,556 B1 | 4/2011 | Duncan et al. |
| 8,201,237 B1 | 6/2012 | Doane et al. |
| 8,209,381 B2 | 6/2012 | Sinn et al. |
| 2002/0023960 A1 | 2/2002 | Knowles et al. |
| 2002/0033418 A1 | 3/2002 | Knowles et al. |
| 2002/0115457 A1 | 8/2002 | Koscal |
| 2003/0037261 A1 | 2/2003 | Meffert et al. |
| 2004/0046031 A1 | 3/2004 | Knowles et al. |
| 2004/0128547 A1 | 7/2004 | Laidlaw et al. |
| 2004/0243835 A1 | 12/2004 | Terzis et al. |
| 2005/0198501 A1 | 9/2005 | Andreev et al. |
| 2005/0262083 A1 | 11/2005 | Brown |
| 2006/0041933 A1 | 2/2006 | Yakov et al. |
| 2006/0282662 A1 | 12/2006 | Whitcomb |
| 2006/0288228 A1 | 12/2006 | Botz et al. |
| 2007/0056025 A1 | 3/2007 | Sachdeva et al. |
| 2007/0199054 A1 | 8/2007 | Florencio et al. |
| 2007/0250920 A1 | 10/2007 | Lindsay |
| 2008/0028206 A1 | 1/2008 | Sicard et al. |
| 2008/0040783 A1 | 2/2008 | Larson et al. |
| 2008/0059804 A1 | 3/2008 | Shah et al. |
| 2008/0162925 A1 | 7/2008 | Okaya |
| 2008/0212771 A1 | 9/2008 | Hauser |
| 2008/0222299 A1 | 9/2008 | Boodaei |
| 2008/0229402 A1 | 9/2008 | Smetters et al. |
| 2009/0125993 A1 | 5/2009 | Delia et al. |
| 2009/0132808 A1 | 5/2009 | Baentsch et al. |
| 2009/0185687 A1 | 7/2009 | Wankmueller et al. |
| 2009/0198618 A1 | 8/2009 | Chan et al. |
| 2009/0259839 A1 | 10/2009 | Jung et al. |
| 2009/0300721 A1 | 12/2009 | Schneider |
| 2010/0180328 A1 | 7/2010 | Moas |
| 2011/0296486 A1 | 12/2011 | Burch et al. |
| 2013/0173484 A1 | 7/2013 | Wesby |
| 2013/0205404 A1 | 8/2013 | King |

OTHER PUBLICATIONS

Hegt, Stan "Analysis of Current and Future Phishing Attacks on Internet Banking Services", May 2008.

Naumann, Ingo "Privacy and Security Risks When Authenticating on the Internet wit European eID Cards", Nov. 2009.

Schneier, Bruce "Schneier on Security" A blog covering security and security technology, Nov. 23, 2004.

European Payments Council Customer-to Bank Security Good Practices Guide http://europeanpaymentscouncil.eu/documents, Mar. 15, 2009.

Cavoukian, Ann "Privacy by Design . . . Take the Challenge" Aug. 2008.

Zhang, Dawei "Network Security Middleware Based on USB Key" 5th IEEE International Simposium on Embedded Computing, IEEE Computer Society (pp. 77-81), 2008.

Sestus "Virtual Token—Real Authentication" http://www.sestus.com/vt/, 2008.

Pashalidis, Andreas, Mitchell, Chris, J., "Single Sign-On Using Trusted Platforms", Royal Holloway, University of London, Egham, Surrey, TW20 0EX, United Kingdom, http://www.isg.rhul.ac.uk pp. 1-15.

Menezes, et al; Handbook of Applied Cryptography, CRC Press LLC, 1997, pp. 359-363, pp. 388-391, pp. 394-399, pp. 490-491, pp. 548-549, XP002702416, USA.

SYSTEM AND METHOD FOR SECURE REMOTE ACCESS TO A SERVICE ON A SERVER COMPUTER

REFERENCE TO RELATED APPLICATIONS

This application is a continuation-in-part application of U.S. application Ser. No. 14/231,545 filed on Mar. 31, 2014, which is a continuation of U.S. patent application Ser. No. 13/765,049, filed Feb. 12, 2013, now issued as U.S. Pat. No. 8,739,252, which claims benefit of U.S. Provisional Application Ser. No. 61/599,556, filed Feb. 16, 2012. This application also claims benefit from the Provisional Application No. 61/839,218, filed Jun. 25, 2013, the entire contents of all aforementioned applications are incorporated herein by reference.

FIELD OF THE INVENTION

The invention relates to the field of computer authentication and authorization. More particularly, the invention relates to a system and method for secure remote connection to computing services.

BACKGROUND OF THE INVENTION

Authentication is the mechanism for securely identifying users, typically through user ID and password. These credentials are vulnerable to malware attacks, such as key logging. In order to access local resources on a computer, conventional authentication methods employing user ID (Identity Document) and password are adequate. When a remote service is activated, it is unprotected and open to hacking.

Accordingly, it would be beneficial to provide an improved approach for providing a secure access to remote computing services, which would avoid or mitigate the shortcomings of the existing prior art.

SUMMARY OF THE INVENTION

It is an object of the present invention to provide a system, method and apparatus for secure remote connection to computing services.

According to one aspect of the invention there is provided a method for remotely accessing a service on a server computer, including:
separating authentication and authorization processes, comprising excluding service access privileges from the authenticating process and transferring the privileges to the authorization process, including:
  (i) authenticating a client device; and
  (ii) upon successful authenticating of the client device, performing the authorization process, comprising:
    (ii-1) establishing an authorization connection between the client device and the server computer;
    (ii-2) at the server computer, detecting the authorization connection, and verifying the authorization connection; and
    (ii-3) upon successful verification of the authorization connection, allowing the access of the client device to the service on the server computer.

Beneficially, the step (ii-2) further includes, upon detecting the authorization connection, creating a blocking process to block access of the client device to the service on the server computer; and the step (ii-3) may further include, upon successful verification of the authorization connection, terminating the blocking process on the server computer, prior to the allowing the access of the client device to the service on the server computer.

Additionally, establishing the authorization connection further includes establishing a remote desktop connection; and creating the blocking process may further include creating a blocking window on a desktop of the server computer.

Creating the blocking window further includes creating a modal dialog window.

Creating the blocking process further includes providing a QR code (Quick Response code) including a dynamic connection information for the authorization connection in a blocking window on a client terminal; and at the client device, obtaining the dynamic connection information from the QR code.

The method further includes at the client device, obtaining from a remote network location, an authorization software and an input information to the authorization software; and wherein step (ii) may further include:
  (ii-4) executing the authorization software on the client device and the remote network location with the obtained input information; and
  (ii-5) provided an output from the authorization software on the client device and the remote network location may be the same, allowing the access to the service on the server computer.

The remote network location is one of the following: the server computer; or another authentication and authorization server computer.

The authorization software is configured to perform an OTA (One-Time-Authorization).

The method further includes performing the OTA using a one-way function and a dynamic connection information for the authorization connection as an input to the one-way function.

The method further includes one or more of the following:
sharing an output from the authorization software on the client device and the server computer or a third party server computer via a shared clipboard; or
sending the output from the authorization software on the client device to the server computer or the third party server computer via a secure channel; or
copying the output from the authorization software on the client device to a clipboard, and pasting the output into a secure shell executing a blocking process to block access of the client device to the service on the server computer.

The client device is one of the following: a computing device having a processor; or a portable device having a memory, the portable device being different from the computing device, and being operably coupled to the computing device.

The step (i) further includes:
obtaining, from a remote network location, an authentication software, and causing the authentication software to obtain a user selectable PIN (Personal Identification Number), and a UID (unique identifier) of the client device;
forwarding the PIN, the UID and the authentication software to the remote network location for generating a user-personalized credential code using the PIN, the UID and the authentication software, comprising encrypting the user-personalized credential code;
at the client device, obtaining the user-personalized credential code from the remote network location, and verifying an authenticity of the user selectable PIN and the UID, without communicating over a network, comprising decrypting the user-personalized credential code; and retrieving access credentials to the remote network location upon verifying the authenticity of the user selectable PIN and the UID.

The remote network location is one of the following: the server computer; or another authentication and authorization server computer.

The authentication software is configured to perform an OTA (One-Time-Authorization).

The method further includes: automatically signing into the service in a remote desktop window on a client terminal using user account credentials; using the service; the user signing out of the service in the remote desktop window on the client terminal; and closing the authorization connection on the server computer.

Additionally, the method further includes upon successful verification, automatically forwarding access credentials for accessing the service on the server computer to a remote network location for authenticating with the remote network location.

The access credentials include a one-time password, which may be changed at each occasion when access to the service on the server computer is requested.

According to another aspect of the invention there is provided a system for remote access to a service on a server computer, including:
 a client device having a processor;
 a server computer; and
 computer readable instructions stored in a memory of the client device and the server computer, causing:
  separate authentication and authorization processes, comprising excluding service access privileges from the authenticating process and transferring the privileges to the authorization process, comprising:
   (i) authenticating the client device; and
   (ii) upon successful authenticating of the client device, performing the authorization process, comprising:
    (ii-1) establishing an authorization connection between the client device and the server computer;
    (ii-2) at the server computer, detecting the authorization connection, and verifying the authorization connection; and
    (ii-3) upon successful verification of the authorization connection, allowing the access of the client device to the service on the server computer.

The computer readable instructions further cause the processor, upon detecting the authorization connection, to create a blocking process to block access of the client device to the service on the server computer; and upon successful verification of the authorization connection, to terminate the blocking process on the server computer, prior to the allowing the access of the client device to the service on the server computer.

The computer readable instructions further cause the processor to establish a remote desktop connection; and to create a blocking window on a desktop of the server computer.

Additionally, the computer readable instructions further cause the processor to create a modal dialog window.

Conveniently, the computer readable instructions further cause the processor to provide a QR code (Quick Response code) including a dynamic connection information for the authorization connection in a blocking window on a client terminal; and at the client device, obtain the dynamic connection information from the QR code.

The system further includes: at the client device, causing the processor to obtain from a remote network location, an authorization software and an input information to the authorization software; and wherein the processor is further caused to:
 (ii-4) execute the authorization software on the client device and the remote network location with the obtained input information; and
 (ii-5) provided an output from the authorization software on the client device and the remote network location may be the same, allow the access to the service on the server computer.

The remote network location is one of the following: the server computer; or another authentication and authorization server computer.

The authorization software is configured to perform an OTA (One-Time-Authorization).

The system is further configured to perform the OTA using a one-way function and a dynamic connection information for the authorization connection as an input to the one-way function.

The system further configured to cause the processor to perform one or more of the following: sharing an output from the authorization software on the client device and the server computer or a third party server computer via a shared clipboard; or sending the output from the authorization software on the client device to the server computer or the third party server computer via a secure channel; or copying the output from the authorization software on the client device to a clipboard, and pasting the output into a secure shell executing a blocking process to block access of the client device to the service on the server computer.

The client device is one of the following: a computing device having a processor; or a portable device having a memory, the portable device being different from the computing device, and being operably coupled to the computing device.

The computer readable instructions further cause the processor to:
 obtain, from a remote network location, an authentication software, and cause the authentication software to obtain a user selectable PIN (Personal Identification Number), and a UID (unique identifier) of the client device;
 forward the PIN, the UID and the authentication software to the remote network location for generating a user-personalized credential code using the PIN, the UID and the authentication software, comprising encrypting the user-personalized credential code;
 at the client device, obtain the user-personalized credential code from the remote network location, and verify an authenticity of the user selectable PIN and the UID, without communicating over a network, comprising decrypting the user-personalized credential code; and
 retrieve access credentials to the remote network location upon verifying the authenticity of the user selectable PIN and the UID.

The remote network location is one of the following: the server computer; or another authentication and authorization server computer.

Additionally, the authentication software is configured to perform an OTA (One-Time-Authorization).

The system further comprises computer readable instructions causing the processor to: automatically sign into the service in a remote desktop window on a client terminal using user account credentials; use the service; the user to sign out of the service in the remote desktop window on the client terminal; and close the authorization connection on the server computer.

The system further comprises computer readable instructions causing the processor to automatically forward access credentials for accessing the service on the server computer to a remote network location for authenticating with the remote network location, upon successful verification.

The access credentials include a one-time password, which is changed at each occasion when access to the service on the server computer is requested.

Thus, an improved system, method and apparatus for secure remote connection to computing services have been provided.

BRIEF DESCRIPTION OF THE DRAWINGS

Further features and advantages of the invention will be apparent from the following description of the embodiment, which is described by way of example only and with reference to the accompanying drawings, in which.

Figure 1:
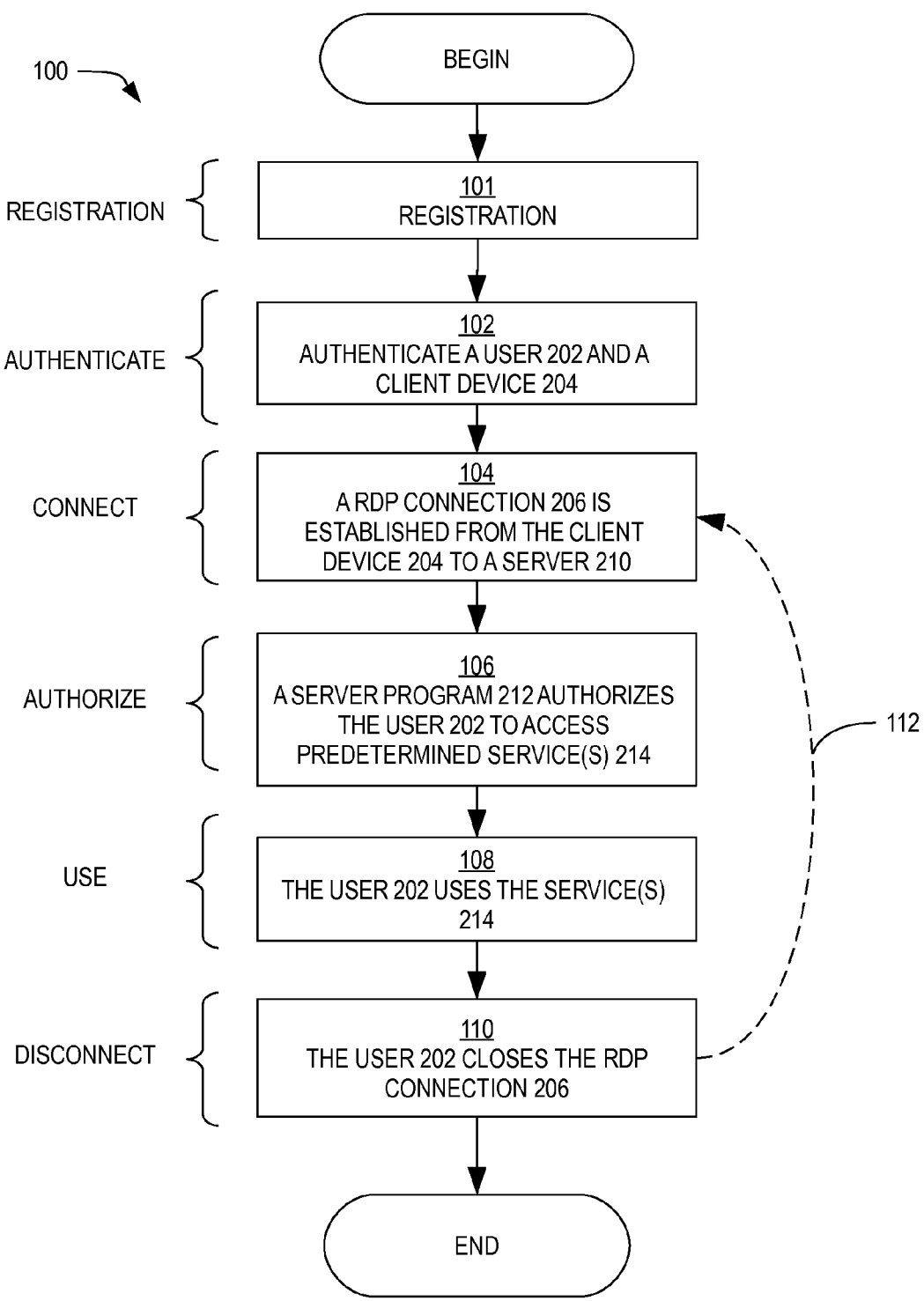
FIG. 1 shows a top level flowchart of a method in accordance with a first embodiment of the present invention.

The accompanying drawings are included to provide a further understanding of the present invention and are incorporated in and constitute a part of this specification. The drawings illustrate some embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION OF EMBODIMENTS OF THE INVENTION

Embodiments of the present invention address deficiencies in conventional authentication and authorization processes when remote connections are used to access computing services. The process of authorization is distinct from that of authentication. Whereas authentication is the process of verifying that "you are who you say you are", authorization is the process of verifying that "you are permitted to do what you are trying to do". Authorization thus presupposes authentication.

Various embodiments of the present invention will be described in general using summary flowcharts and block diagrams with each general description followed by detailed flowcharts and block diagrams.

In general, embodiments of the present invention provide methods and systems for remotely accessing a service on a server computer. Authentication and authorization processes are executed separately. Service access privileges are withheld from the authenticating process and transferred to the authorization process. First, a user and client device are authenticated, using PIN and unique client device ID (FIG. 1, 102). After successful authenticating of the user and client device, the authorization process is performed. An authorization connection between the client device and the server computer is established. The server computer detects and verifies the authorization connection. After successful verification of the authorization connection, the client device is allowed access to the service on the server computer.

Figure 2:
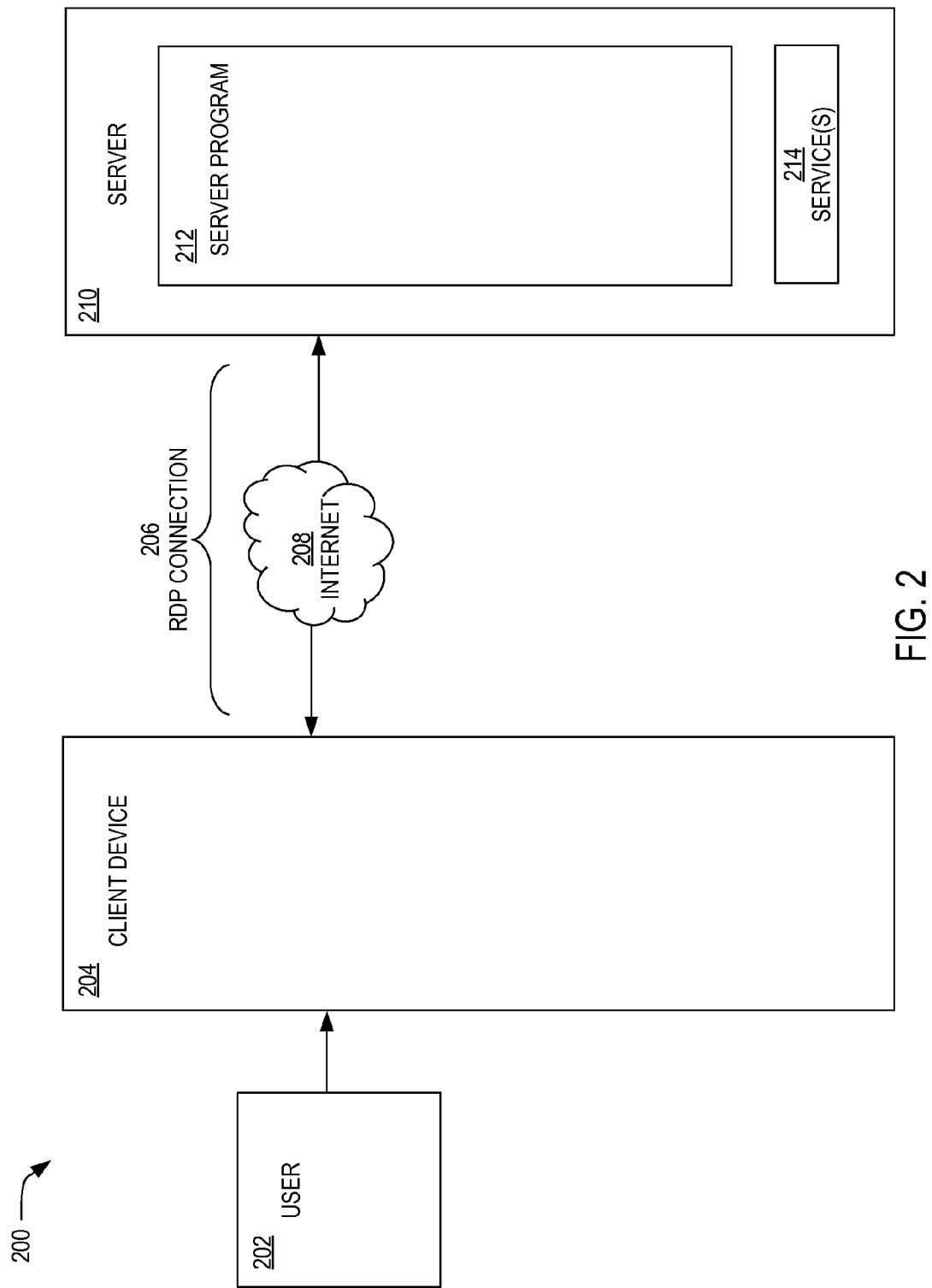
FIG. 2 shows an overview block diagram of a system in accordance with the first embodiment of the present invention with elements referenced in the flowchart of FIG. 1.

Referring to FIG. 1 there is shown a summary flowchart of a method 100 of a first embodiment of the present invention; and in FIG. 2 there is shown a block diagram 200 of a system including elements referred to in the flowchart 100 in FIG. 1.

Firstly, a user 202 and a user device 204, or a client device 204, the two terms to be used interchangeably in this application, are authenticated 102. The user device 204 may be, for example a computing device, a personal computer, tablet computer, a smart phone, portable device, or any other device suitable for the user 202 to remotely access desired services.

Next, a remote desktop connection 206 is established 104 from the client device 204 to a server computer 210. The server computer 210 may be, for example, at a remote network location or a local network location. The remote desktop connection 206 may be made through a network such as, for example, the Internet 208, a LAN (local area network), WAN (wide area network), or the like. The remote desktop connection 206 may be based on conventional protocols such as RDP (Remote Desktop Protocol) or VNC (Virtual Network Computing) protocols or the like. The server computer 210 may be, for example, a computing system within a bank, on-line retailer or any other like institution offering one or more predetermined on-line service(s) 214. In general, the server computer 210 may be, for example, a computer having a processor configured to execute instructions stored in a memory (not shown). For clarity, the predetermined services 214 comprise computer readable instructions stored in the memory of the server computer 210. As well, the server program comprises computer readable instructions stored in the memory of the server computer 210.

All modules or blocks shown inside the client device 204 and the server computer 210 comprise computer readable instructions stored in a non-transitory computer readable storage medium, such as computer memory, CD-ROM, DVD or similar, for retrieval and/or execution by a processor.

Next, a server program 212 executing on the server computer 210 authorizes 106 the user 202 to access and use the predetermined services 214 on the server computer 210 that are available to the authenticated user 202 and authenticated client device 204.

Next, the user 202 uses 108 the predetermined services 214 in a conventional manner.

When the user 202 is finished using the predetermined services 214, the user 202 closes 110 the RDP connection 206. Optionally, the user 202 may repeat 112 the connection 104 to closing 110 processes as many times as desired without repeating the authentication 102 process.

To enable the authentication 102 process and the authorization 106 process, the user undergoes a registration 101 process, which includes a method for generating a trusted, unique identifier. The registration 101 process will now be described in more detail with reference to the flowchart shown in FIGS. 3A and 3B; and the block diagrams shown in FIGS. 4A and 4B. For clarity, a layout guide 302 shows an arrangement of FIGS. 3A and 3B.

First, the client device 204 establishes 304 a secure connection 402 with the server computer 210. The secure connection 402 may be based on any secure protocol known in the art such as SSL (Secure Sockets Layer), TLS (Transport Layer Security), or the like.

Then server program 212 sends 306 an invitation in including a URL (Uniform Resource Location) for downloading 312 a client program 408 from, for example, a download site on the Internet 208. The invitation may optionally include a registration code (not shown). The invitation 404 may be sent via email or any other conventional message system. The client program 408, after downloading 312, comprises authentication software 409 and authorization software 411 including computer readable instructions stored in a memory (not shown) of the client device 204. The authentication software 409 is used for the process of user and device authorization, and the authorization software 411 is used for the process of authorizing access to the service, which has been separated from the process of authentication, as will be described in further detail below.

Having received the invitation 404 the user decides 308 to accept the invitation 404 or not. If the user 202 does not accept the invitation 404 the registration process 101 fails and the registration process 101 stops 310.

If the user 202 accepts the invitation, the user 202 downloads 312 the client program 408 using the provided URL 406 to the client device 204 and initiates execution of the client program 408 on the client device 204.

The user 202, optionally, enters the registration code 404, for example, by scanning a Quick Response Code (which includes user registration information) sent by the invitation email.

The user 202 then enters 314 a predetermined user PIN (Personal Identification Number) 410 to the client program 408. The predetermined PIN 410 may be, for example, a user selectable PIN, a secret number known only to the user 202, or biometric information entered using conventional hardware (not shown) included in the client device 204.

The client program 408 sends 316 the user PIN 410, a client device ID 413, and, optionally, the registration code 404 to the server program 212. The client device ID 413 is a copy made by the client program 408 when the client program 408 is initially executed 312 of a static device ID 412 unique to the client device 404 that is determined at time of manufacture. Beneficially, at any time after the registration process 101, the client program 408 may compare the copy of the client device ID 413 with the static device ID 412 for increased security.

The server program 212 generates a random number for providing 318 a secret key 414. The random number may be generated by any process known in the art.

The server program 212 encrypts 320 the secret key 414 using the user PIN 410 and the client device ID 413 as keys to provide a user-personalized credential code in the form of an encrypted secret key 416. The secret key 414 may be encrypted, for example, using any suitable algorithm known in the art such as AES (Advanced Encryption Standard) or the like. Alternatively, a hash function of the client device ID 413 may be used as a key instead of the plain client device ID 413.

The server program 212 sends 322 the encrypted secret key 416 to the client program 408 over the secure connection 402.

The client program 408 decrypts 324 the encrypted secret key 416 using the user PIN 410 and the client device ID 413, or alternatively the hash function of the client device ID 413, as keys. The client program 408 then saves the encrypted secret key 416 for future user pin 410 and client device ID 412 comparison.

The user 202 enters 326 user account access credentials 418 into the client program 408.

Optionally, the server program 212 encrypts 328 the user account access credentials 418 with the secret key 414. The server program 212 sends 330 the encrypted user account credentials (not shown) to the client program 408. The client program 408 decrypts 332 the encrypted user account credentials.

The client program 408 closes 334 the secure connection 402.

Figure 4A:
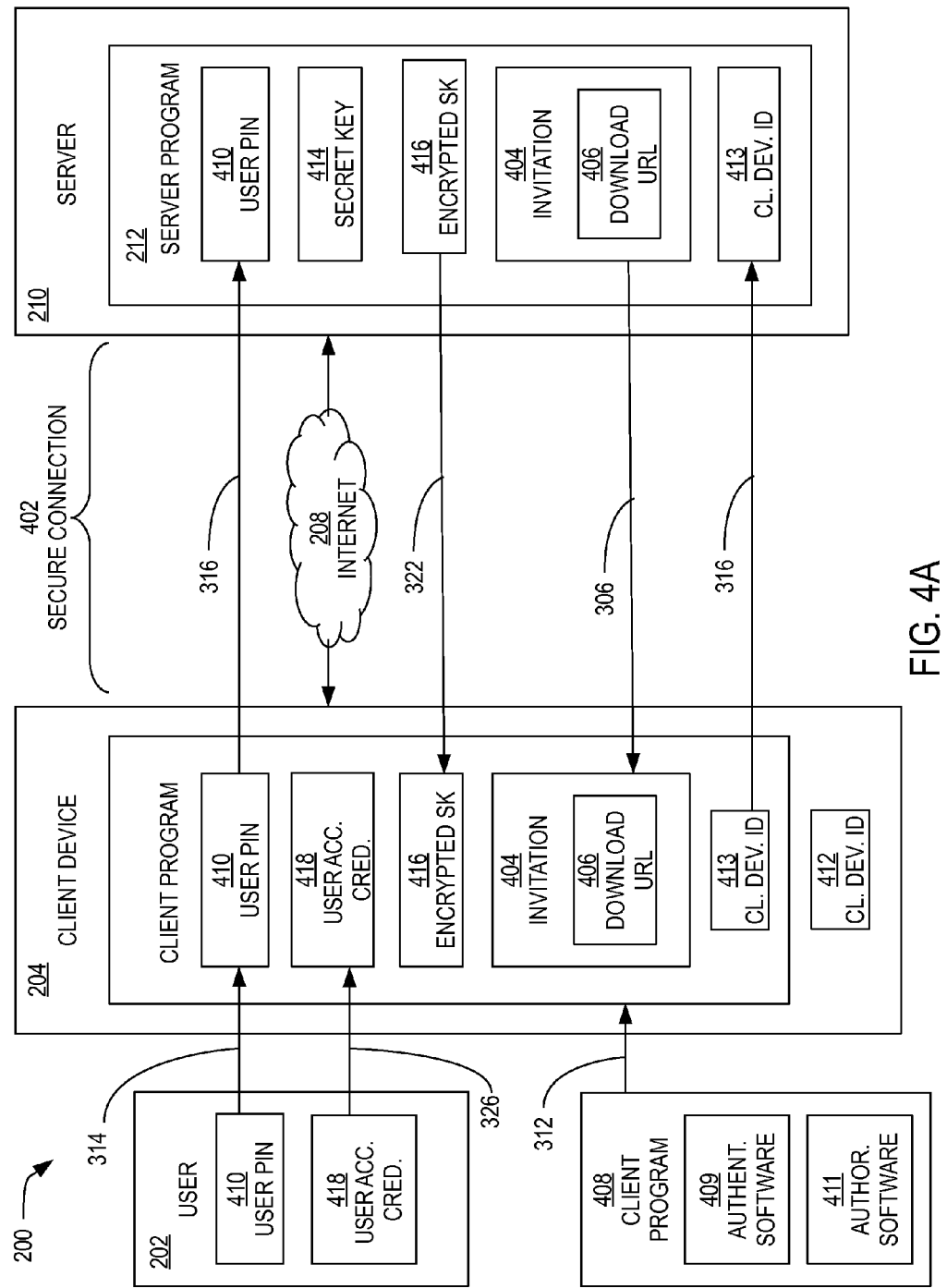
FIGS. 4A and 4B show detailed block diagrams of the system shown in FIG. 2 with elements referenced in the flowcharts of FIGS. 3A and 3B.
Figure 4B:
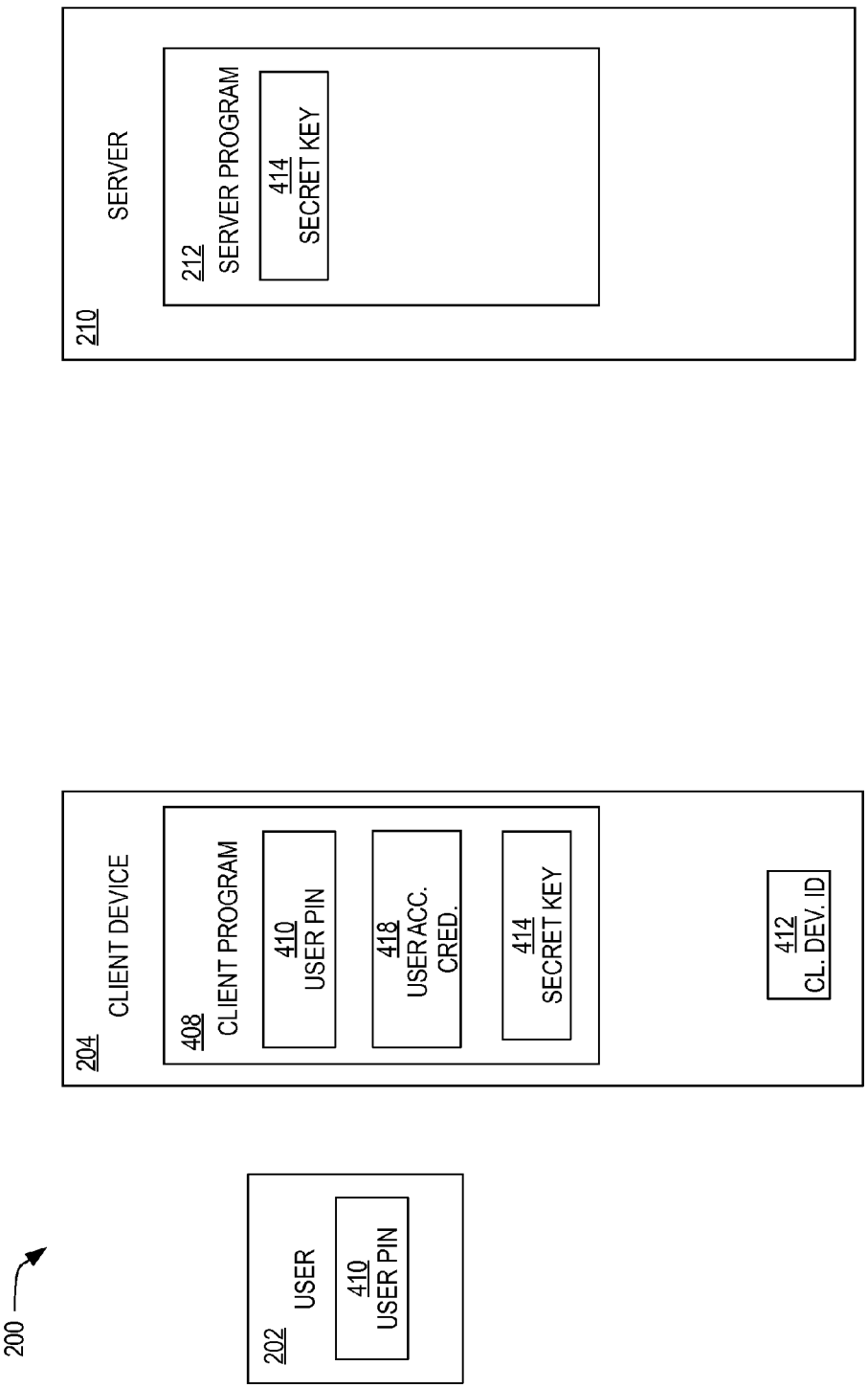

FIG. 4B shows the system 200 after completion of the registration process 101. The registered user 202 and the registered client device 204 are now authenticated since the user 202 and the client device 204 share the predetermined user PIN; and the client program 408 and server program 212 share the secret key 414. After the registration process 101 the client device 204 is what is known in the art as a trusted device.

Figure 5:
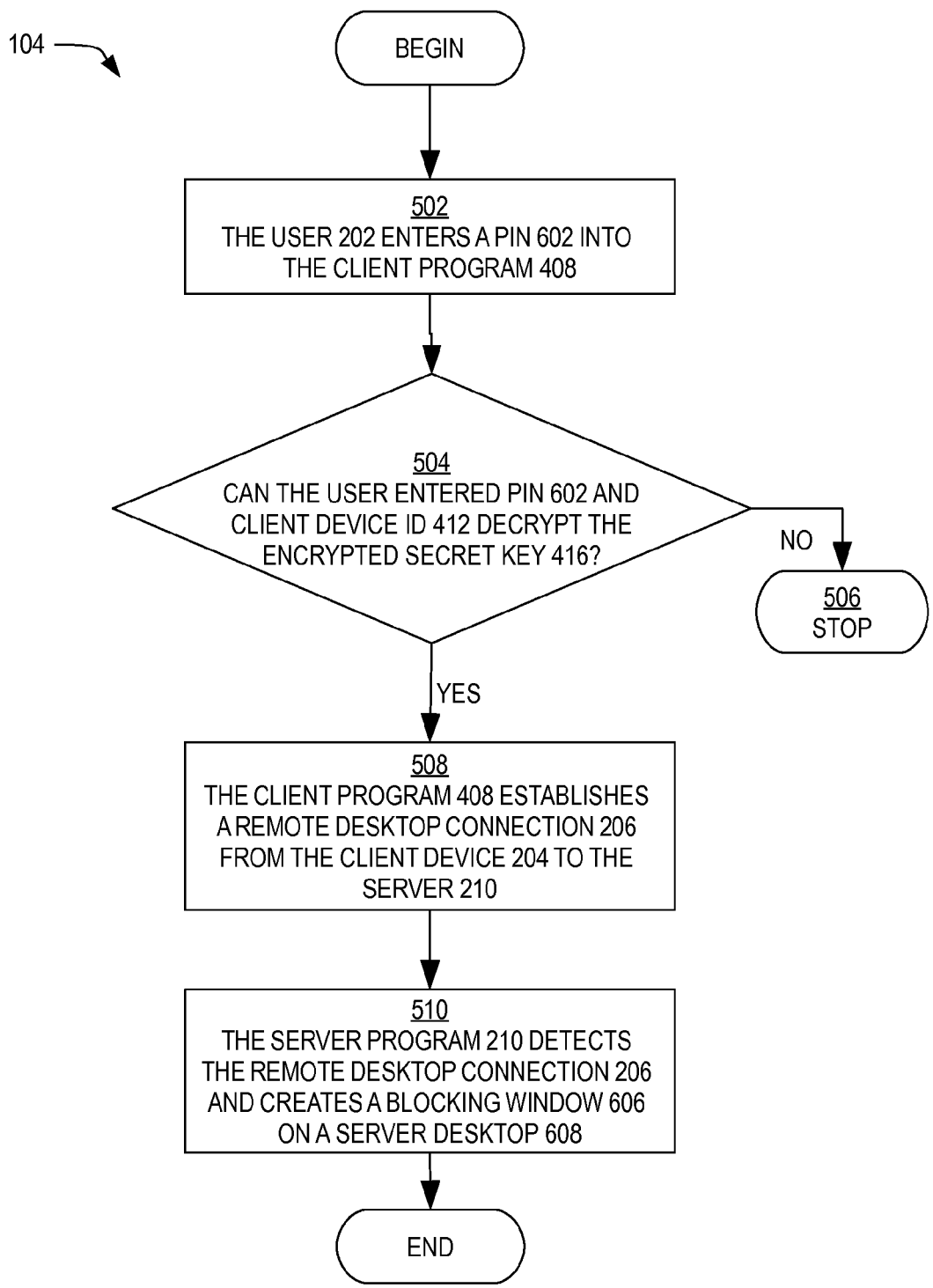
FIG. 5 shows a flowchart of a method of a connection process in the flowchart shown in FIG. 1.
Figure 6:
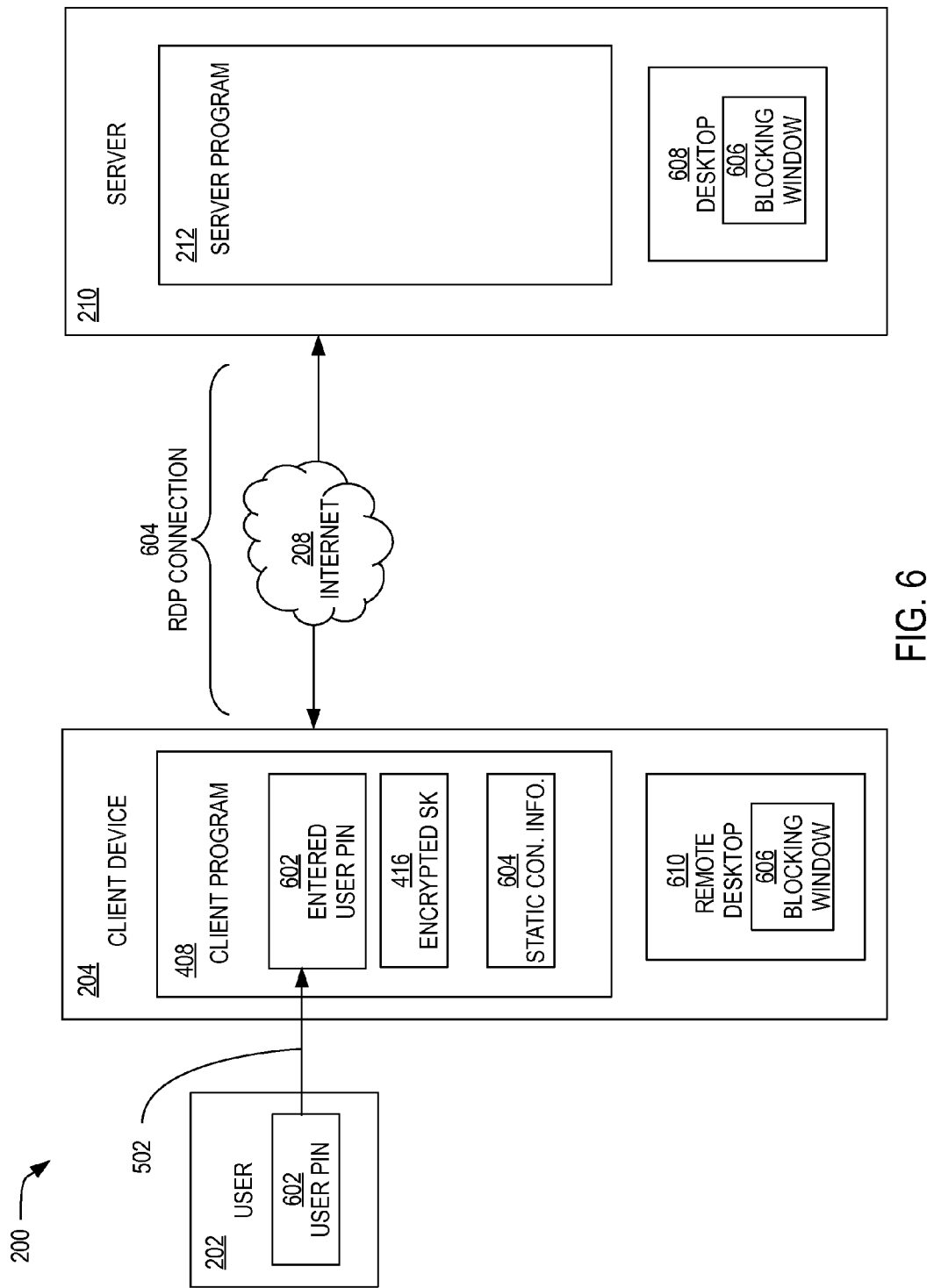
FIG. 6 shows a detailed block diagram of the system shown in FIG. 2 with elements referenced in the flowchart of FIG. 5.

FIG. 5 shows a flowchart of a method of the connection process 104 in the flowchart shown in FIG. 1; and FIG. 6 shows a detailed block diagram of the system 200 shown in FIG. 2 with elements referenced in the flowchart of FIG. 5.

The user 202 enters 502 a PIN 602 into the client program 408. If the entered user PIN 602 and the client device ID 412 do not match their previously registered profiles, the stored, encrypted secret key 416 is not decrypted and the connection process 104 is stopped 506. If the entered user PIN 602 and the client device ID 412 do match their previously registered profiles then the encrypted secret key 416 is decrypted, authenticating the user and device 102 and the connection process 104 continues. Preferably, matching is determined by testing if the user entered PIN 602 and client device ID 412 can decrypt the encrypted secret key 416.

The client program 408 establishes 508 a remote desktop connection 206 from the client device 204 to the server computer 210. The remote desktop connection may be a RDP (Remote Desktop Protocol) or VNC (Virtual Network Computing) connection or the like. The server program 212 detects 510 the remote desktop connection 206 and creates a blocking window 606 on a server desktop 608. The blocking window 606 may be for example a modal dialog box or a modal dialog window. Such a dialog box, as understood in the art, blocks all other user access until certain inputs or actions are provided. In this case the action is the authorization of the user 202 as described herein below. In general, any type of process or program that blocks the user 202 from accessing any services on the server computer 210 until the user 204 is authorized is within the scope of the invention.

Figure 7:
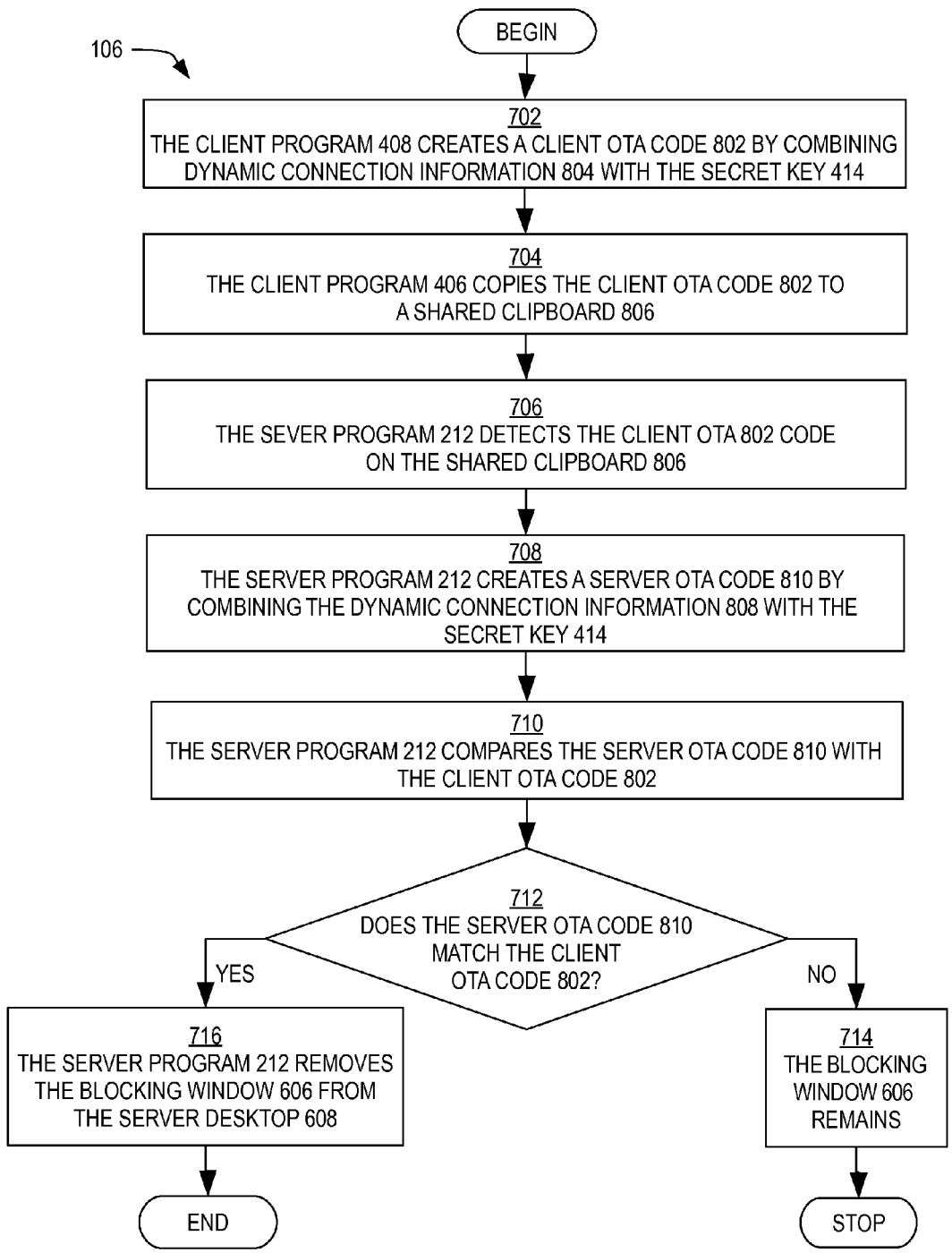
FIG. 7 shows a flowchart of a method of an authorization process in the flowchart shown in FIG. 1.
Figure 8:
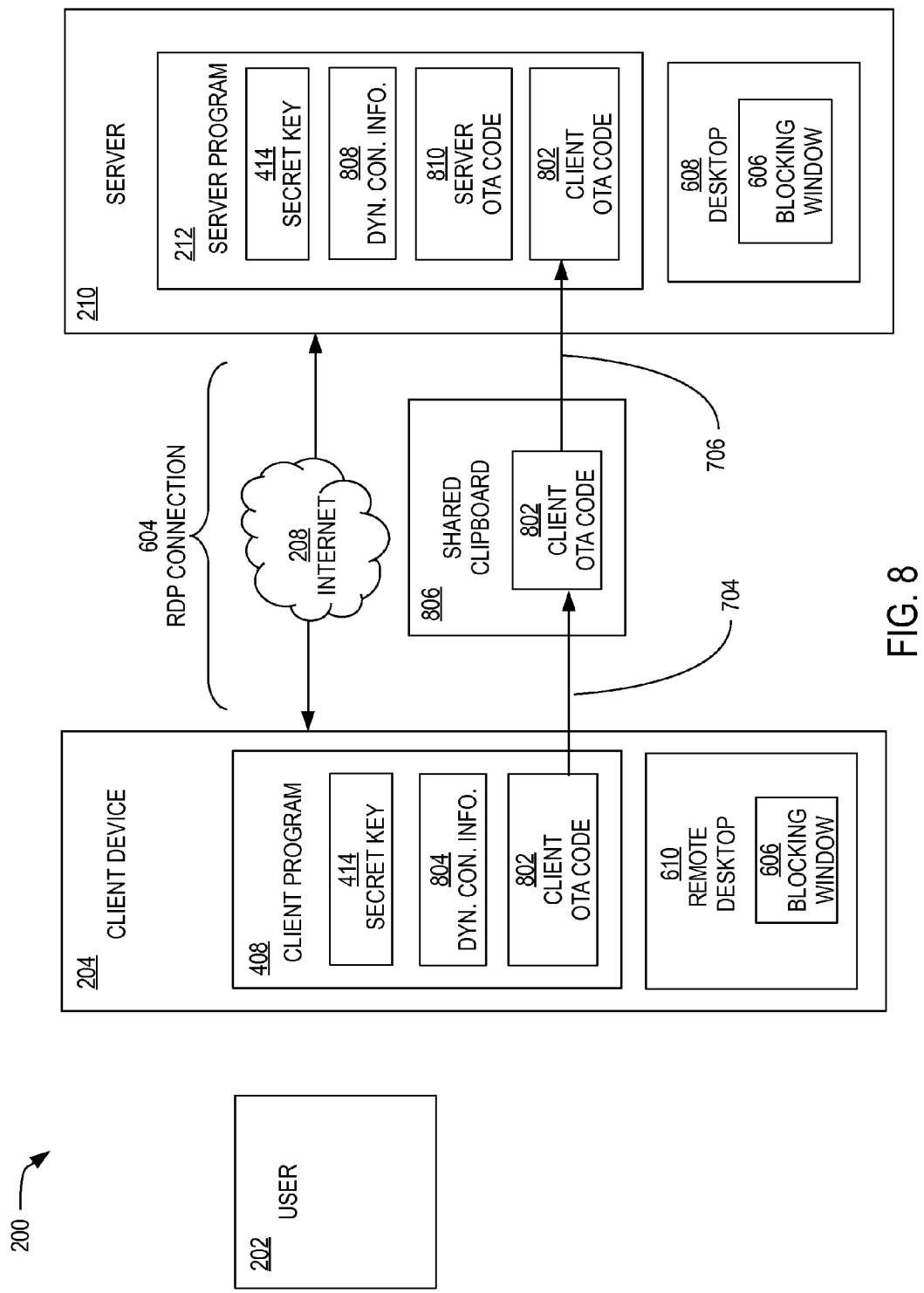
FIG. 8 shows a detailed block diagram of the system shown in FIG. 2 with elements referenced in the flowchart of FIG. 7.

FIG. 7 shows a flowchart of a method of the authorization process 106 in the flowchart shown in FIG. 1 and FIG. 8 shows a detailed block diagram of the system 200 shown in FIG. 2 with elements referenced in the flowchart of FIG. 7.

First, the client program 408 creates 702 a client One-Time Authorization (OTA) code 802 by combining input information including dynamic connection information 804 and the secret key 414. The OTA code provides a one-time passcode, which is changed at each occasion when access to the service on the server computer is requested. The dynamic connection information 804 may be, for example, an IP (Internet Protocol) address, port number, time stamp or any combination thereof. The dynamic connection information 804 and, secret key 414 are combined using a one-way function such as exclusive OR, or any other one-way function known in the art.

Next, the client program 408 copies 704 the client OTA code 802 to a shared clipboard 806.

Next, the server program 212 detects 706 the client OTA code on the shared clipboard 806. The server program 212 creates 708 a server OTA code 810 by combing input information including the dynamic connection information 808 and the secret key 414. The dynamic connection information 808 may be, for example, an IP (Internet Protocol) address, port number, time stamp or any combination thereof. The dynamic connection information 804 is the same as the dynamic connection information 808 on the server computer 210. The dynamic connection information 808 and secret key 414 are combined using the same one-way function as in creating the client OTA code 802 described herein above.

Next, the server program 212 compares 710,712 the server OTA code 810 with the client OTA code 802. If the server OTA code 810 does not match the client OTA code 802, then the blocking window 606 remains 714 and the authorization process 106 is stopped.

If the server OTA code 810 does match the client OTA code 802, then the server program 212 removes 716 blocking window 606 from the server desktop 608.

Figure 9:
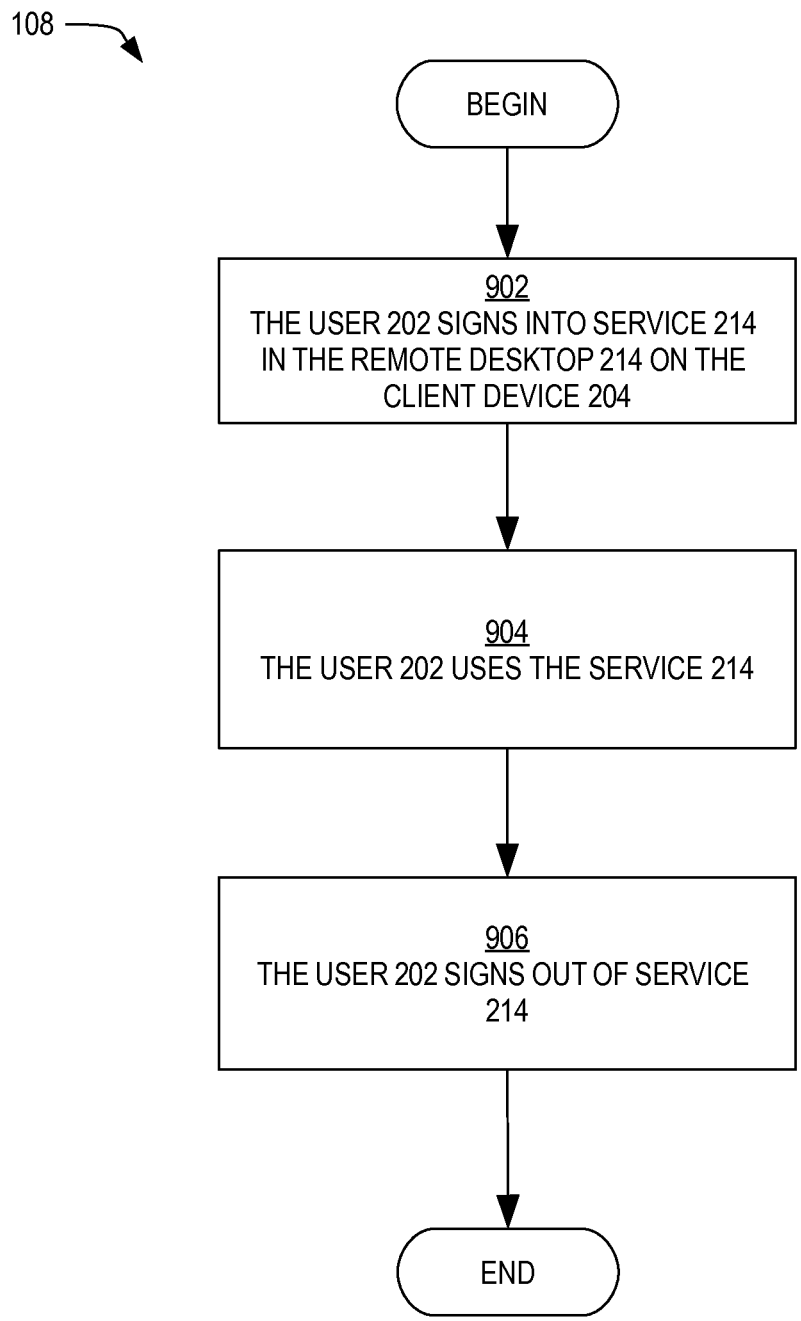
FIG. 9 shows a flowchart of a method of a Using Services process in the flowchart shown in FIG. 1.
Figure 10:
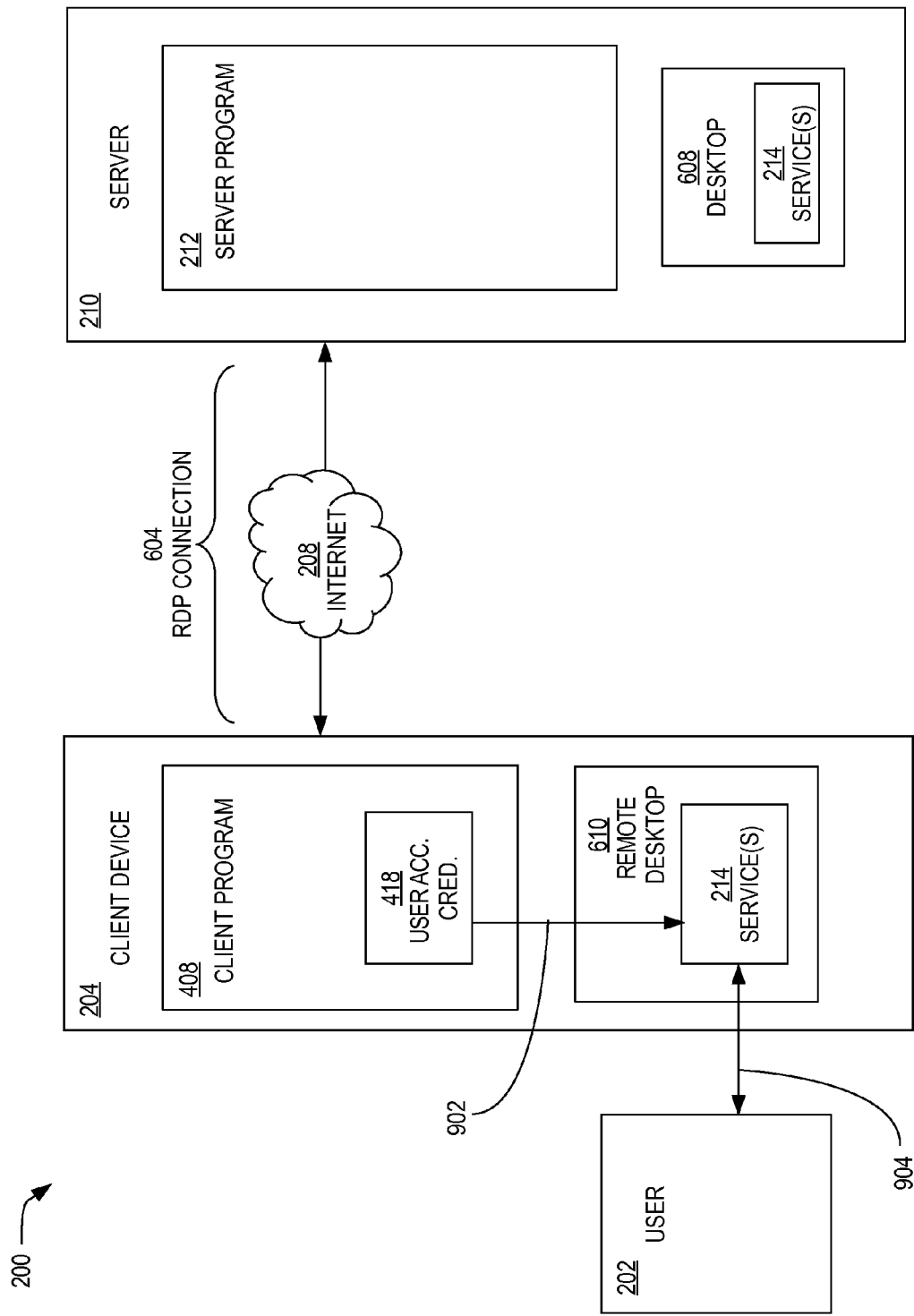
FIG. 10 shows a detailed block diagram of the system shown in FIG. 2 with elements referenced in the flowchart of FIG. 9.

FIG. 9 shows a flowchart of a method of the Using Services 108 process in the flowchart shown in FIG. 1; and FIG. 10 shows a detailed block diagram of the system 200 shown in FIG. 2 with elements referenced in the flowchart of FIG. 9.

First, preferably the client program 408 automatically signs into 902 the service 214 using the user account access credentials 418, or alternatively the user 202 manually signs into the service 214. Then the user 202 uses 904 the service 214 in a conventional manner from the client device 204 such as bank accounts or online retail services. After the user 202 is finished, the user 202 signs out 906 of service 214.

Lastly, the user closes 110 the RDP connection 206 in a conventional manner.

Figure 11:
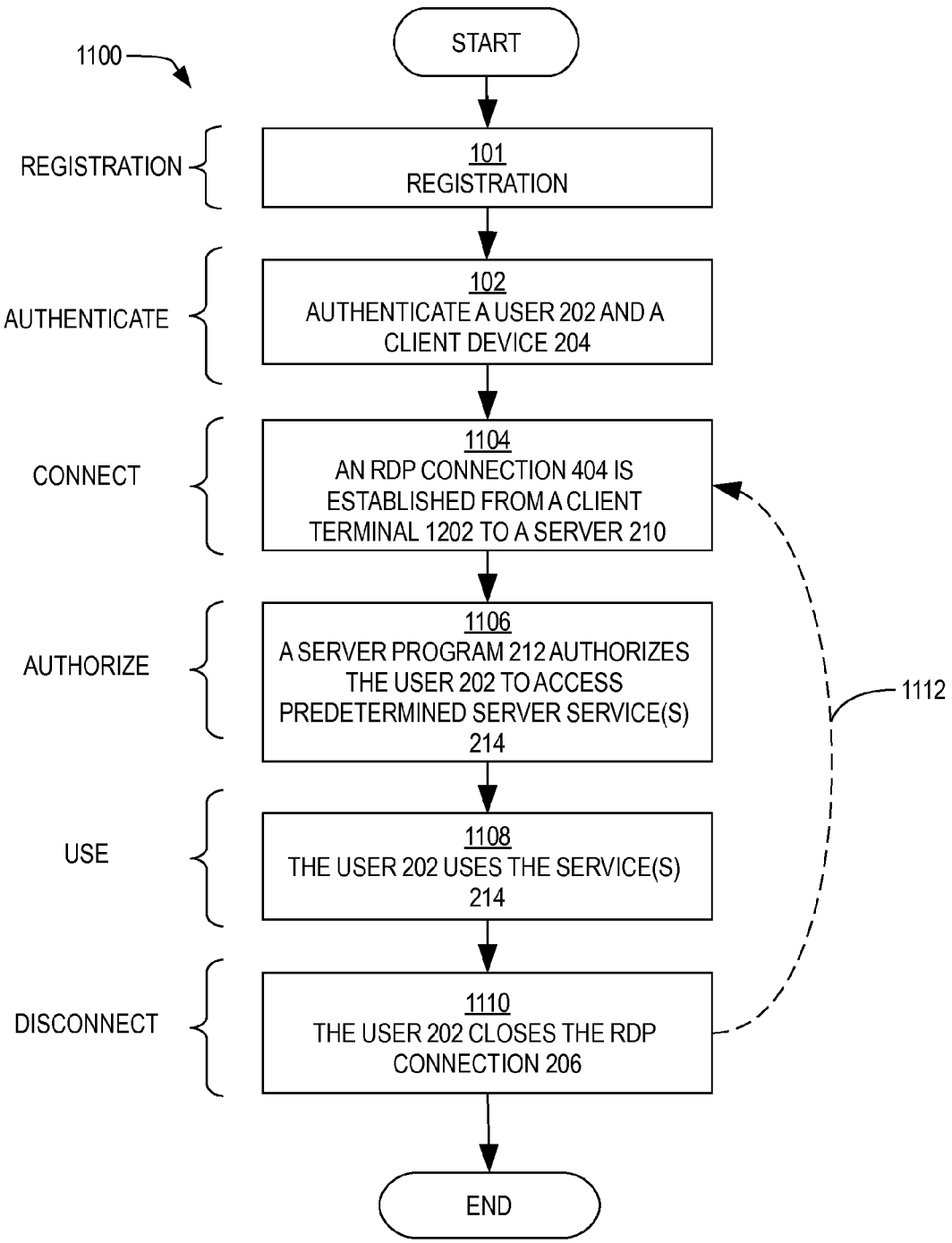
FIG. 11 shows a top level flowchart of a method in accordance with a second embodiment of the present invention.
Figure 12:
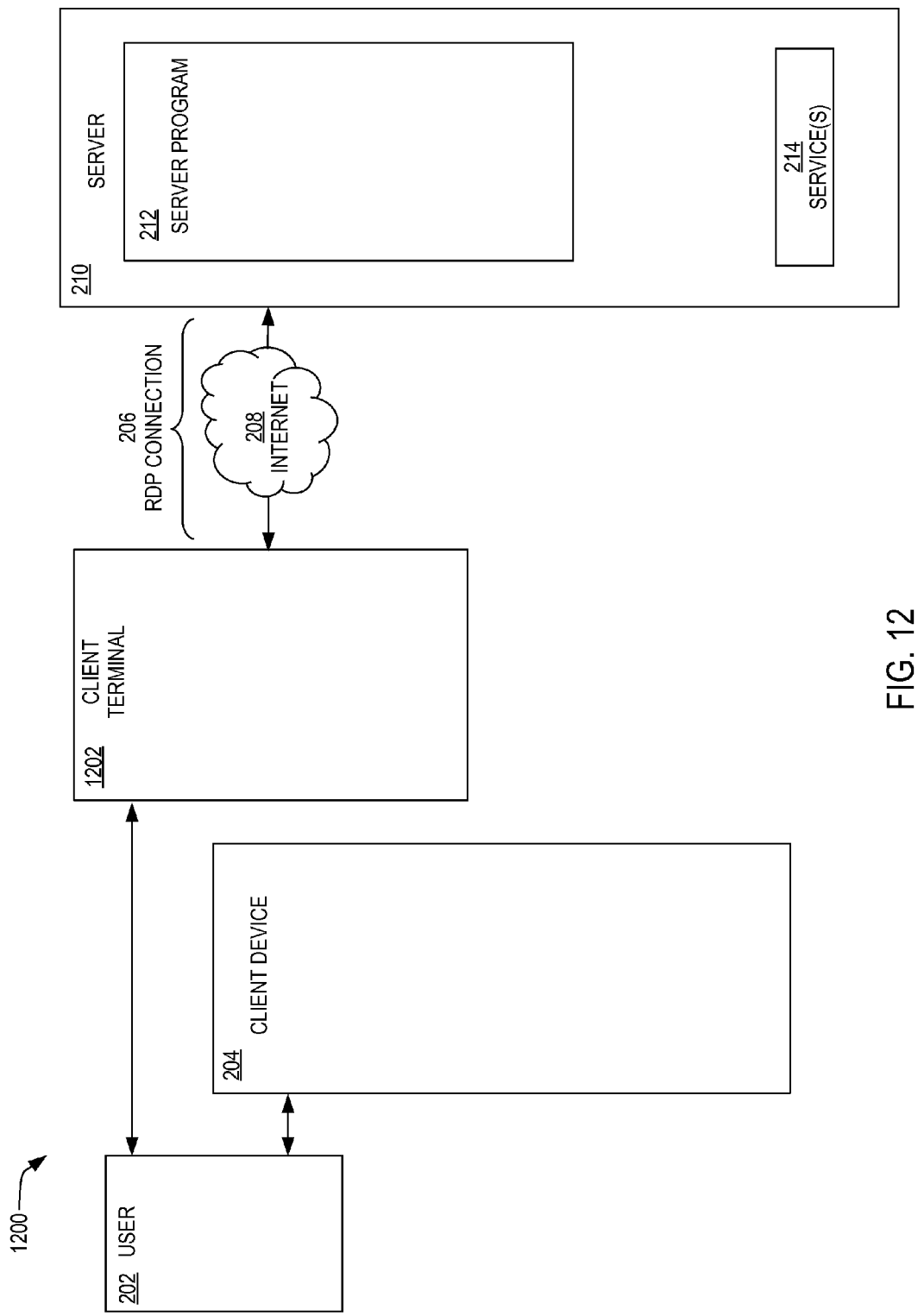
FIG. 12 shows an overview block diagram of a system in accordance with the second embodiment of the present invention with elements referenced in the flowchart of FIG. 11.

Referring now to FIG. 11, there is shown a summary flowchart of a method 1110 in accordance with a second embodiment of the present invention; and FIG. 12 shows an overview block diagram of a system 1200 in accordance with the second embodiment of the present invention with elements referenced in the flowchart of FIG. 11.

Firstly, a user 202 and a user device 204 are authenticated 102. The authentication process 102 of the second embodiment is identical to the authentication process of the first embodiment 102 as described herein above. The user device 204 is preferably mobile device such as a smart phone, PDA (Personal Digital Assistant) or the like having a camera 205 with QR code (Quick Response code) reading capability as is common in the art.

Next, a remote desktop connection 206 is established 104 from a client terminal 1202 to the server computer 210.

Next, a server program 212 authorizes 1106 the user 202 from the client terminal 1202 to access and use the predetermined services 214 on the server computer 210 that are available to the authenticated user 202 and authenticated client device 204. The client terminal may be, for example, a public shared computer in a cafe or library not previously authenticated.

Next, the user 202 uses 108 the predetermined services 214 in a conventional manner.

When the user 202 is finished using the predetermined services 214, the user 202 closes 110 the RDP connection 206. Optionally, the user 202 may repeat 1112 the connection 104 to closing 110 processes as many times as desired without repeating the authentication 102 process.

Figure 13:
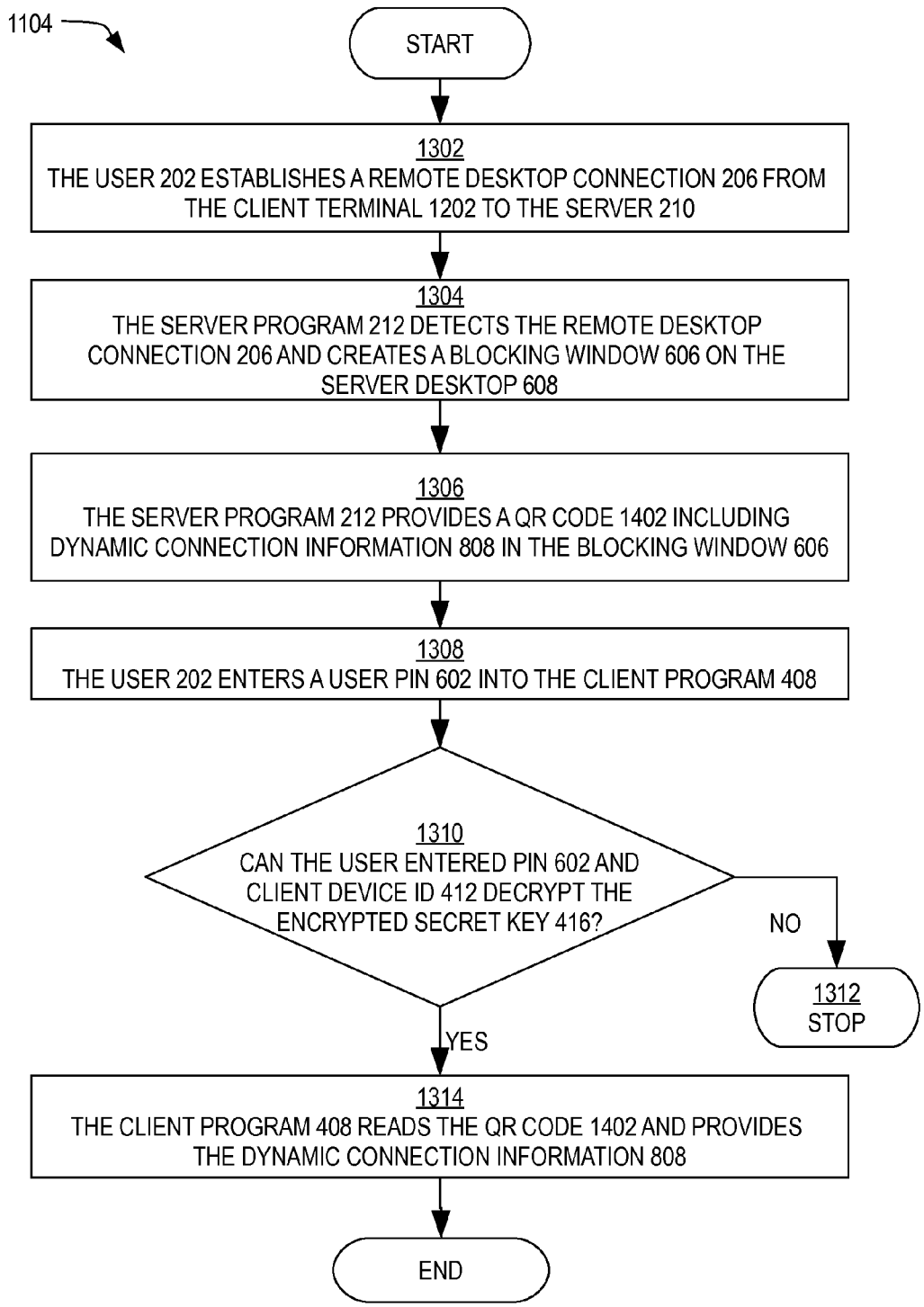
FIG. 13 shows a flowchart of a method of a connection process in the flowchart shown in FIG. 11.
Figure 14:
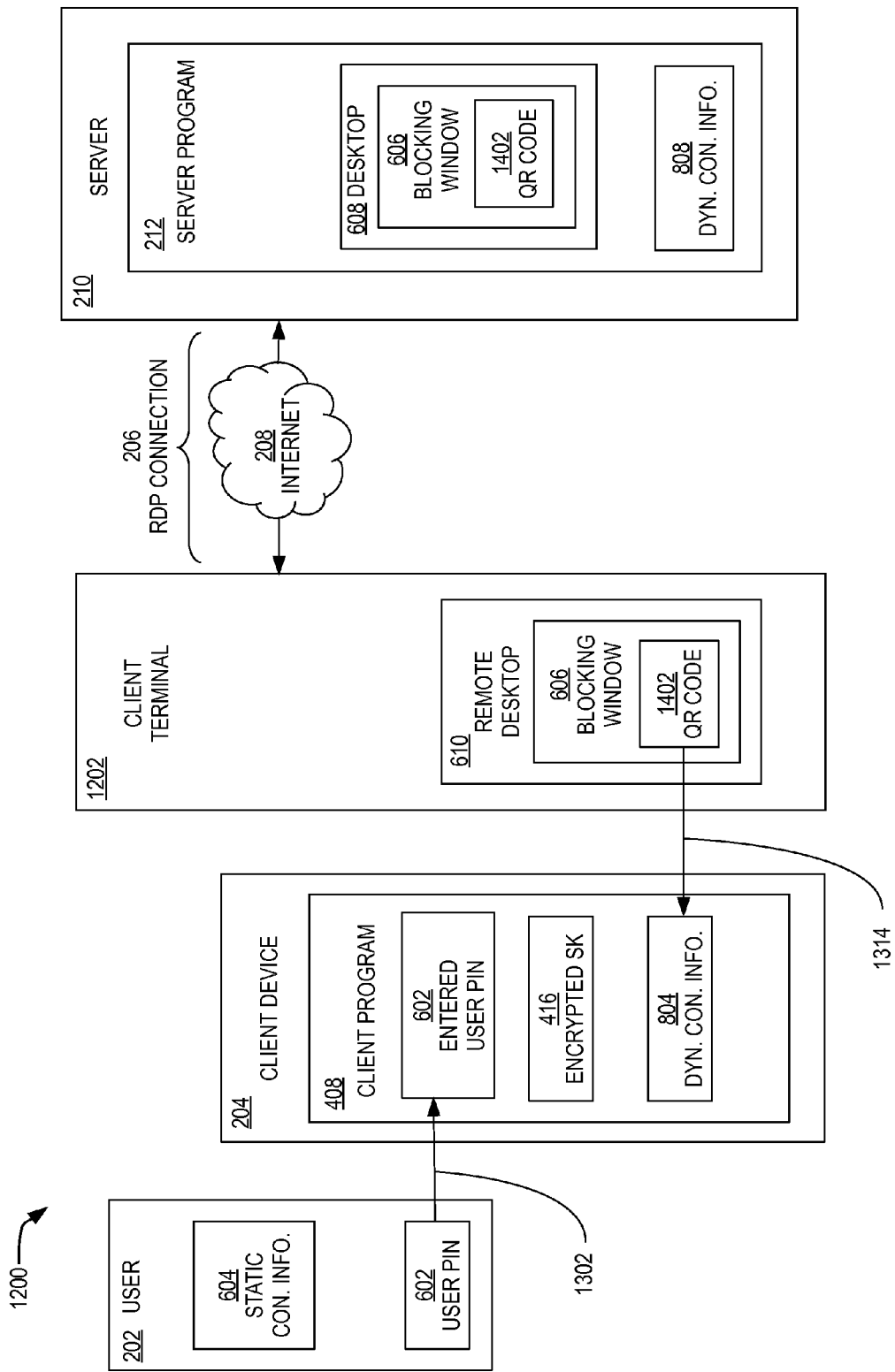
FIG. 14 shows a detailed block diagram of the system shown in FIG. 2 with elements referenced in the flowchart of FIG. 13.

FIG. 13 shows a flowchart of a method of the connection process 1100 in the flowchart shown in FIG. 11; and FIG. 14 shows a detailed block diagram of the system shown in FIG. 2 with elements referenced in the flowchart of FIG. 13.

First, the user 202 establishes 1302 a remote desktop connection 206 from the client terminal 1202 to the server computer 210.

Next, the server program 212 detects 1304 the remote desktop connection 206 and creates a blocking window 606 on the server desktop 608.

Next, the server program 212 provides 1306 a QR code 1402 including the dynamic connection information 808 in the blocking window 606.

Next, the user 202 enters 1308 a user pin 602 into the client program 408. If the entered user PIN 602 and the client device ID 412 do not match their previously registered profiles, the stored encrypted secret key 416 is not decrypted and the connection process 1104 is stopped 1312. If the entered user PIN 602 and the client device ID 412 do match their previously registered profiles then the encrypted secret key 416 is decrypted, authenticating the user and device 102 and the connection process 1104 continues. Preferably, matching is determined by testing if the user entered PIN 602 and client device ID 412 can decrypt the encrypted secret key 416.

Next, the user 202 holds the client device 204 in a position for the client program 408 to read 1314 the QR code 1402 and provide the dynamic connection information 808 to the client program 408.

Figure 15:
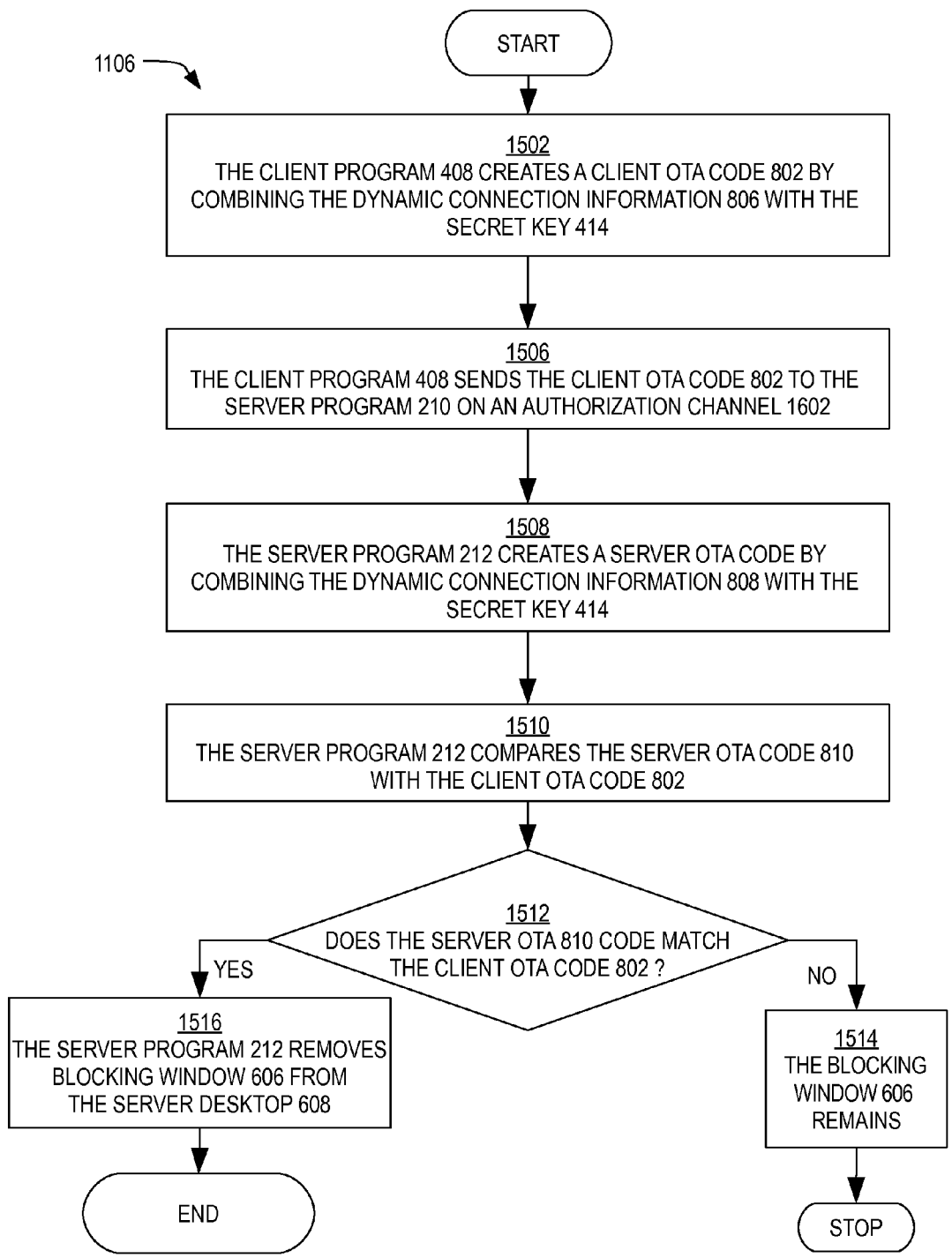
FIG. 15 shows a flowchart of a method of an authorization process in the flowchart shown in FIG. 11.
Figure 16:
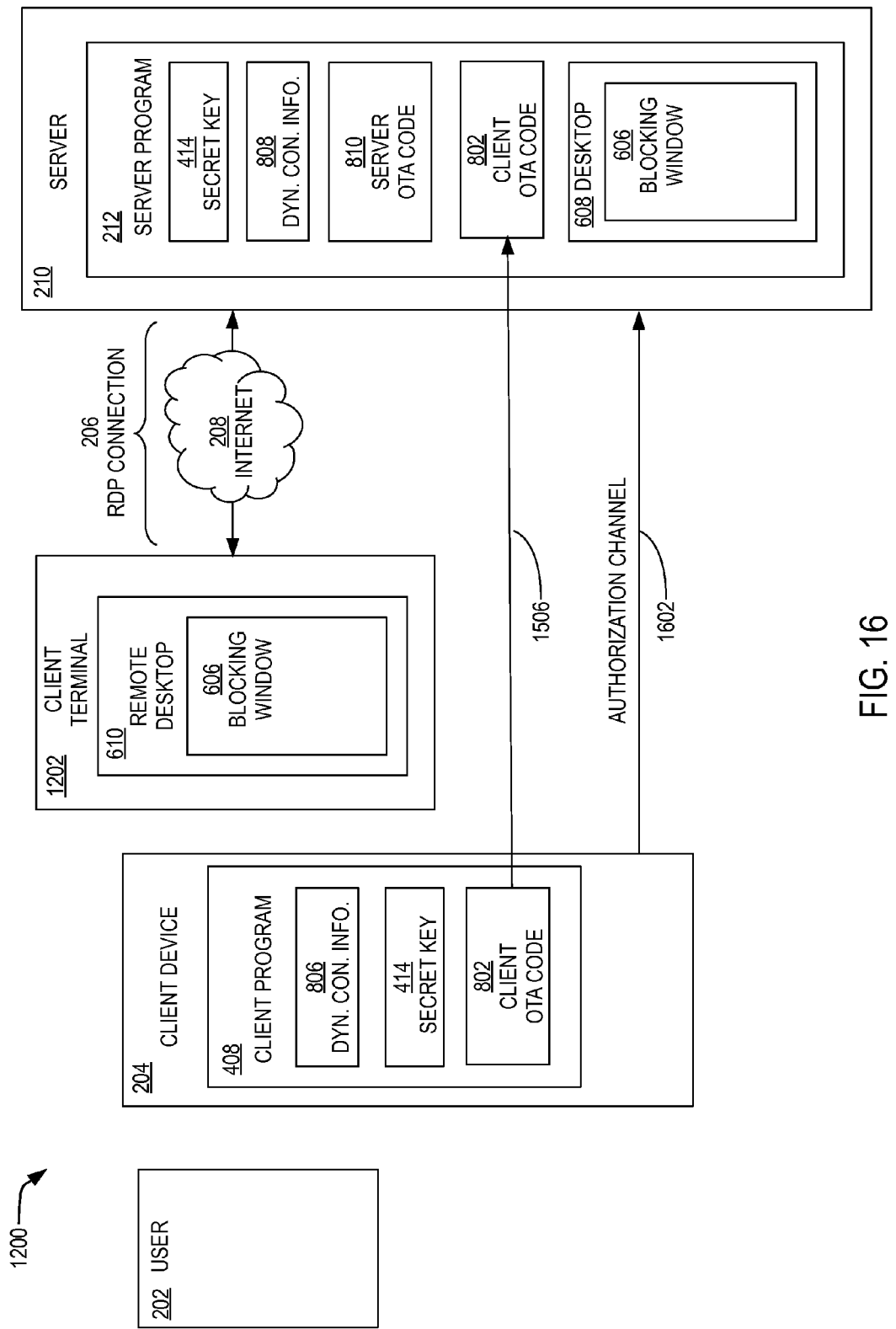
FIG. 16 shows a detailed block diagram of the system shown in FIG. 12 with elements referenced in the flowchart of FIG. 15.

FIG. 15 shows a flowchart of a method of the authorization process 1104 in the flowchart shown in FIG. 11; and FIG. 16 shows a detailed block diagram of the system 1200 shown in FIG. 12 with elements referenced in the flowchart of FIG. 15.

First, the client program 408 creates 1502 a client OTA code 802 by combining the dynamic connection information 806 with the secret key 414.

Then the client program 408 sends 1506 the client OTA code 802 to the server program 212 on an authorization channel 1602. The authorization channel 1602 may be based on any secure protocol known in the art such as SSL (Secure Sockets Layer), TLS (Transport Layer Security), or the like.

Then the server program 212 creates 1508 a server OTA code by combing the dynamic connection information 808 with the secret key 414.

Then the server program 212 compares 1510 the server OTA code 810 with the client OTA code 802. If the server OTA code 810 does not match the client OTA code 802, then the blocking window 606 remains 1514 and the authorization process 106 is stopped.

If the server OTA code 810 does match the client OTA code 802, then the server program 212 removes 516 blocking window 606 from the server desktop 608.

Figure 17:
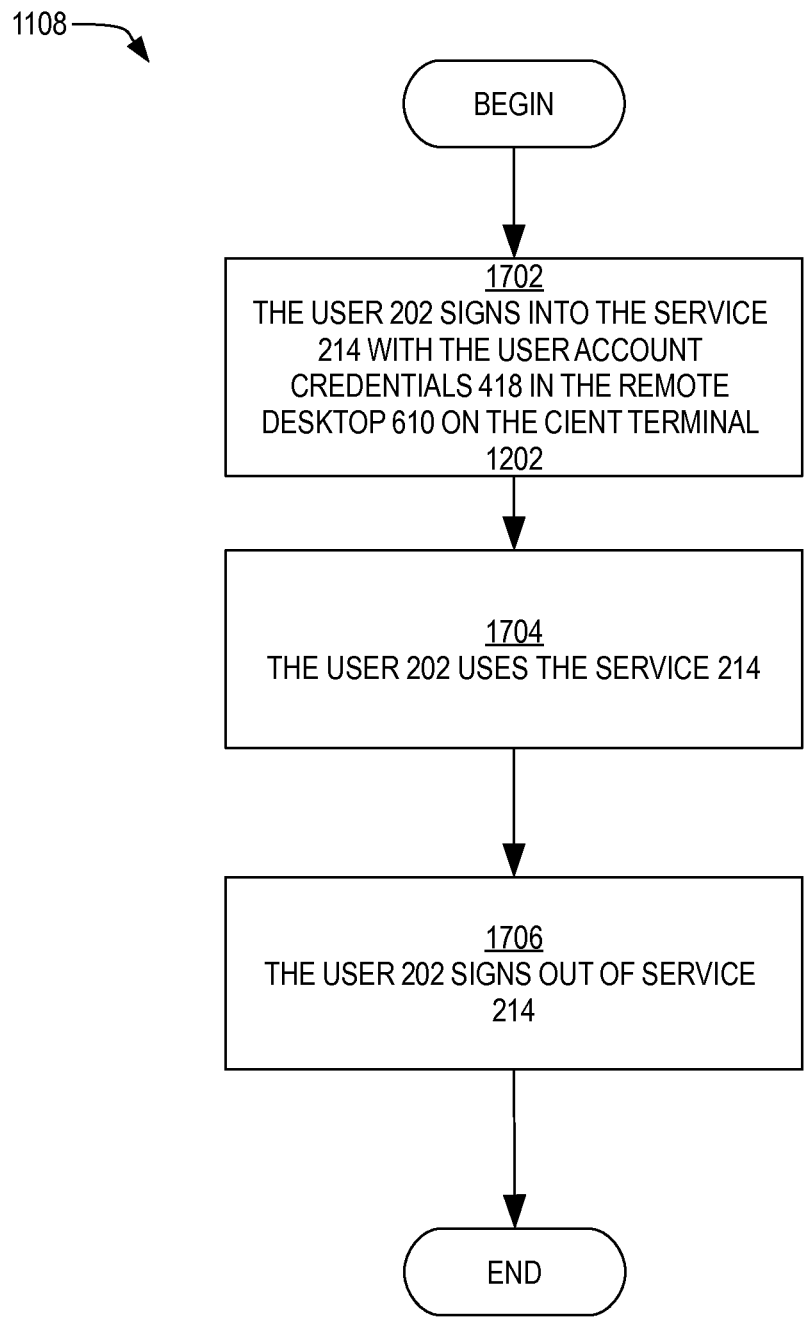
FIG. 17 shows a flowchart of a method of a Using Services process in the flowchart shown in FIG. 11.
Figure 18:
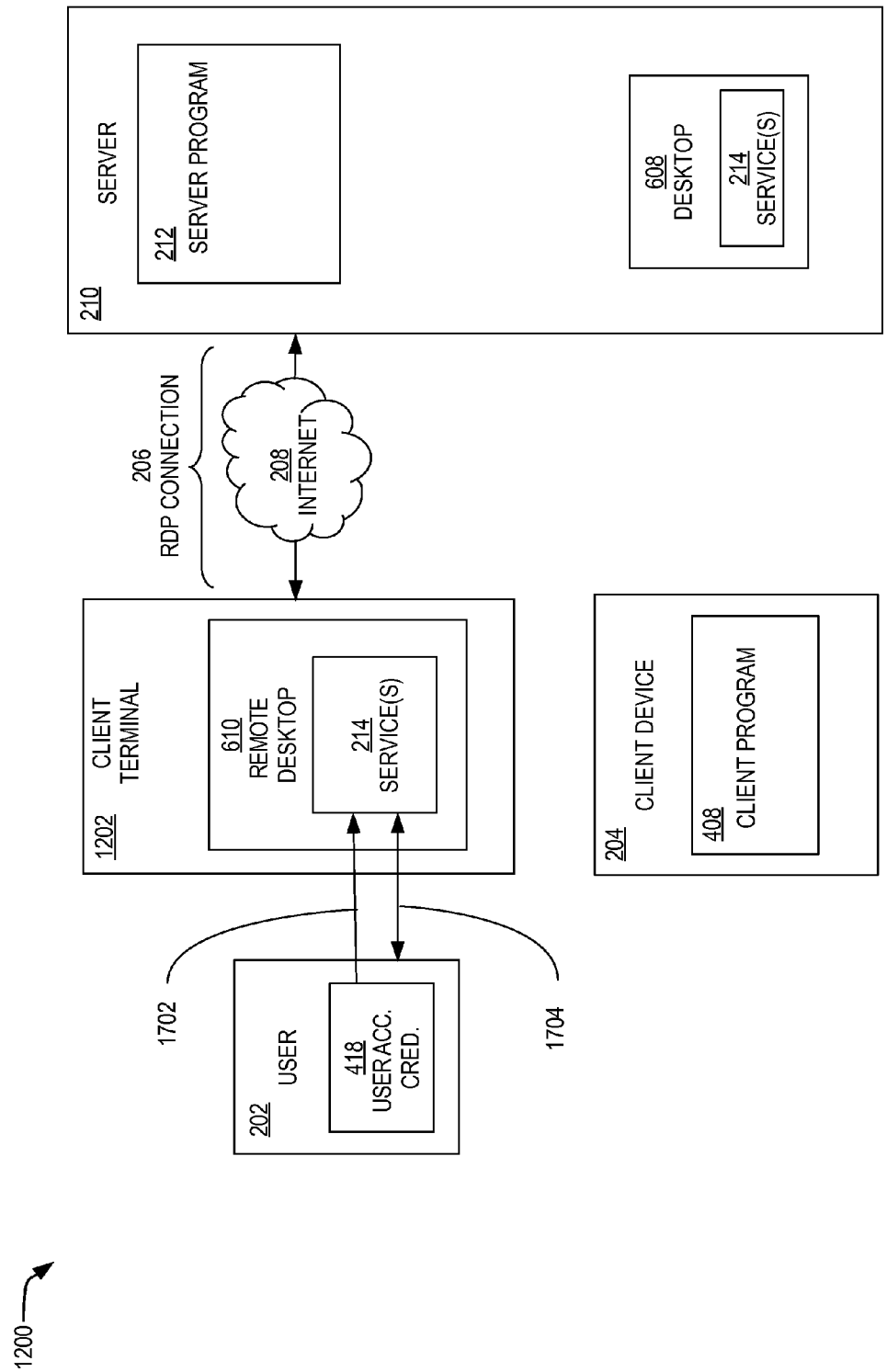
FIG. 18 shows a detailed block diagram of the system shown in FIG. 12 with elements referenced in the flowchart of FIG. 17.

FIG. 17 shows a flowchart of a method of a Using Services process in the flowchart shown in FIG. 11; and FIG. 18 shows a detailed block diagram of the system shown in FIG. 12 with elements referenced in the flowchart of FIG. 17.

The user 202 signs 1702 into the service 214 with the user account access credentials 418 in a remote desktop window 610 on the client terminal 1202. The user 202 uses 704 the service 214 in a conventional manner from the client terminal 1202. The user 202 signs out 1706 of service 214

Lastly, the user 202 closes 1110 the RDP connection 206 in a conventional manner.

Figure 19:
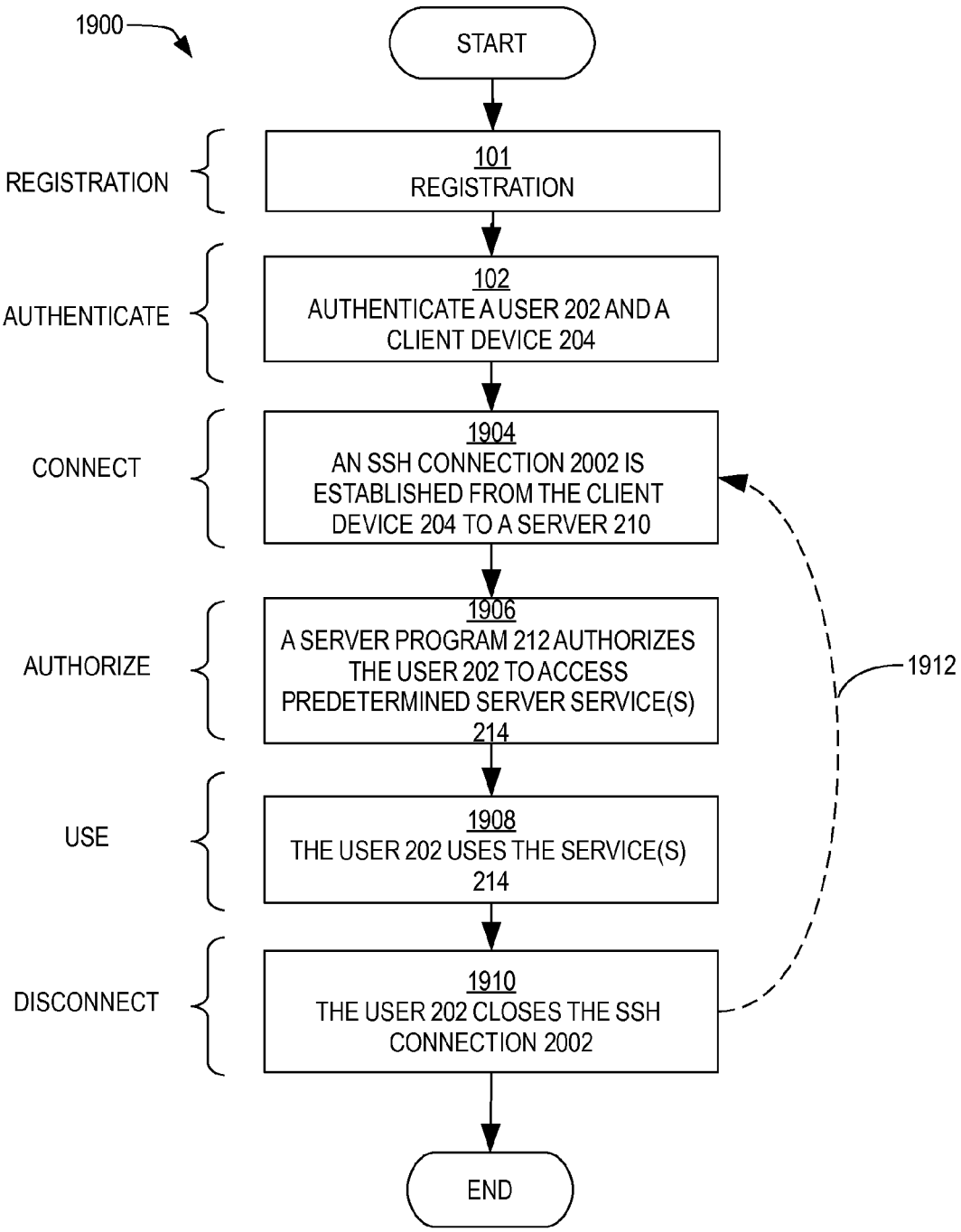
FIG. 19 shows a top level flowchart of a method in accordance with a third embodiment of the present invention.
Figure 20:
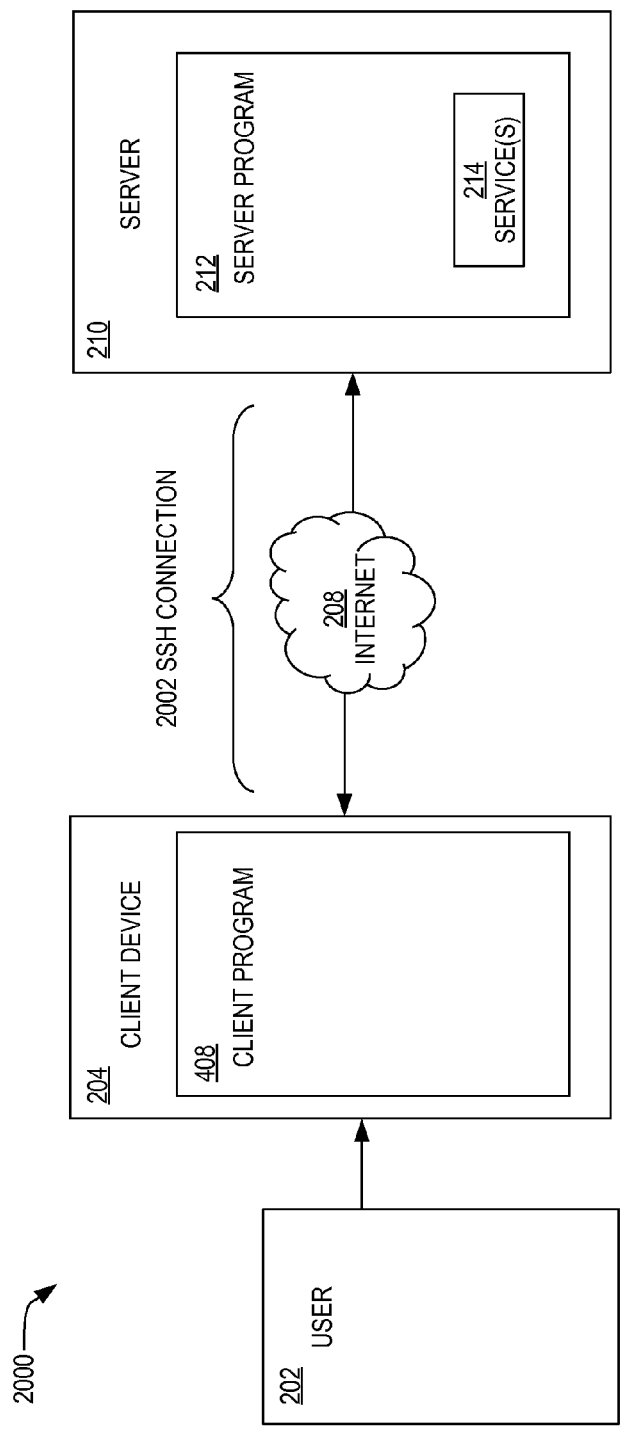
FIG. 20 shows an overview block diagram of a system in accordance with the third embodiment of the present invention with elements referenced in the flowchart of FIG. 19.

FIG. 19 shows a summary flowchart of a method 1900 in accordance with a third embodiment of the present invention; and FIG. 20 shows an overview block diagram of a system 2000 in accordance with the third embodiment of the present invention with elements referenced in the flowchart of FIG. 19.

Firstly, a user 202 and a user device 204 are authenticated 102 using a process identical to the process 102 described in the first embodiment Next, a SSH (secure shell) connection 2002 is established 1904 from the client device 204 to the server computer 210.

Next, a server program 212 authorizes 1906 the user 202 to access and use the predetermined services 214 on the server computer 210 that are available to the authenticated user 202 and authenticated client device 204.

Next, the user 202 uses 1908 the predetermined services 214 in a conventional manner.

When the user 202 is finished using the predetermined services 214, the user 202 closes 110 the SSH connection 2002. Optionally, the user 202 may repeat 1912 the connection 1904 to closing 1910 processes as many times as desired without repeating the authentication 102 process.

Figure 21:
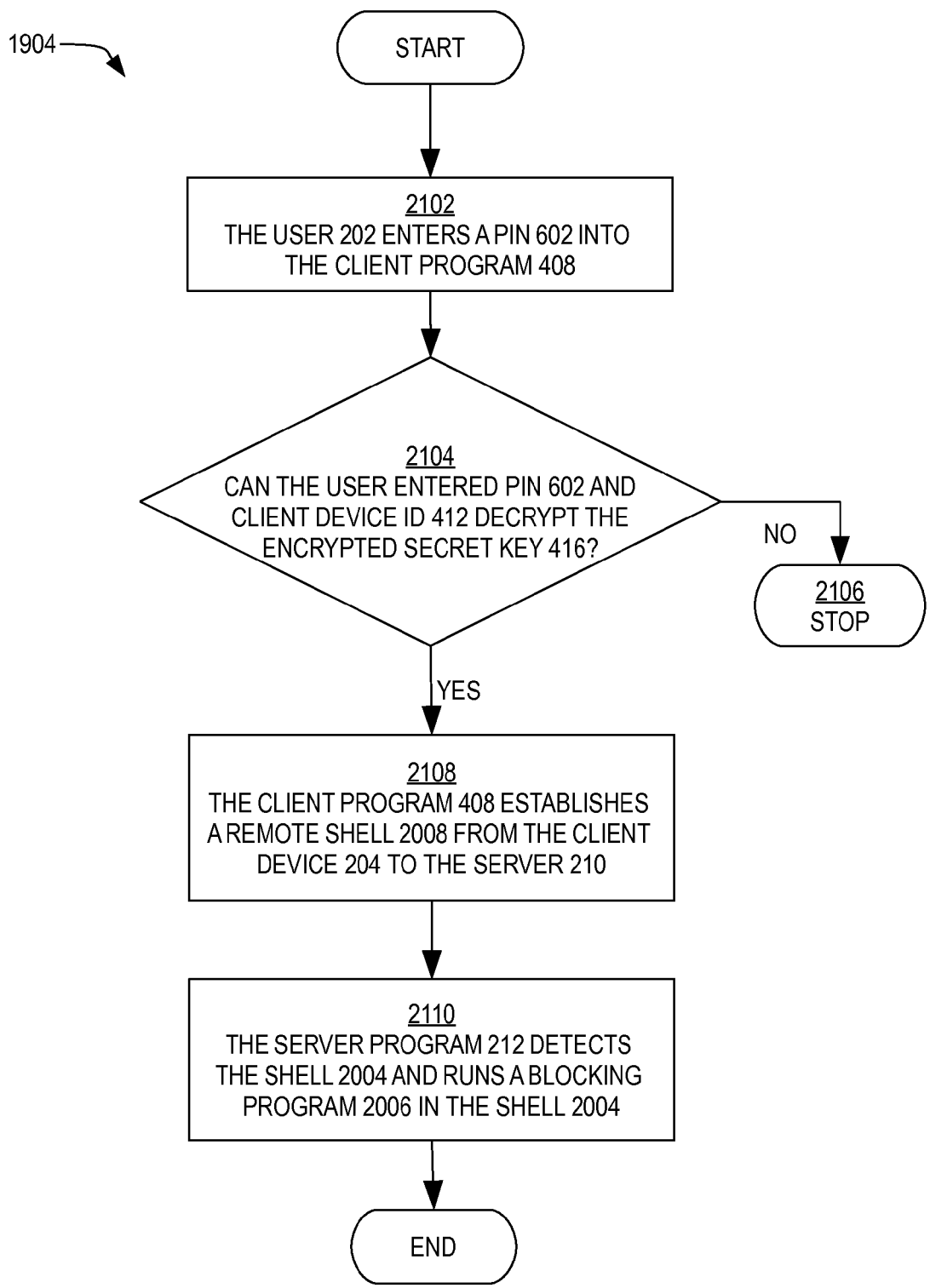
FIG. 21 shows a flowchart of a method of a connection process in the flowchart shown in FIG. 19.
Figure 22:
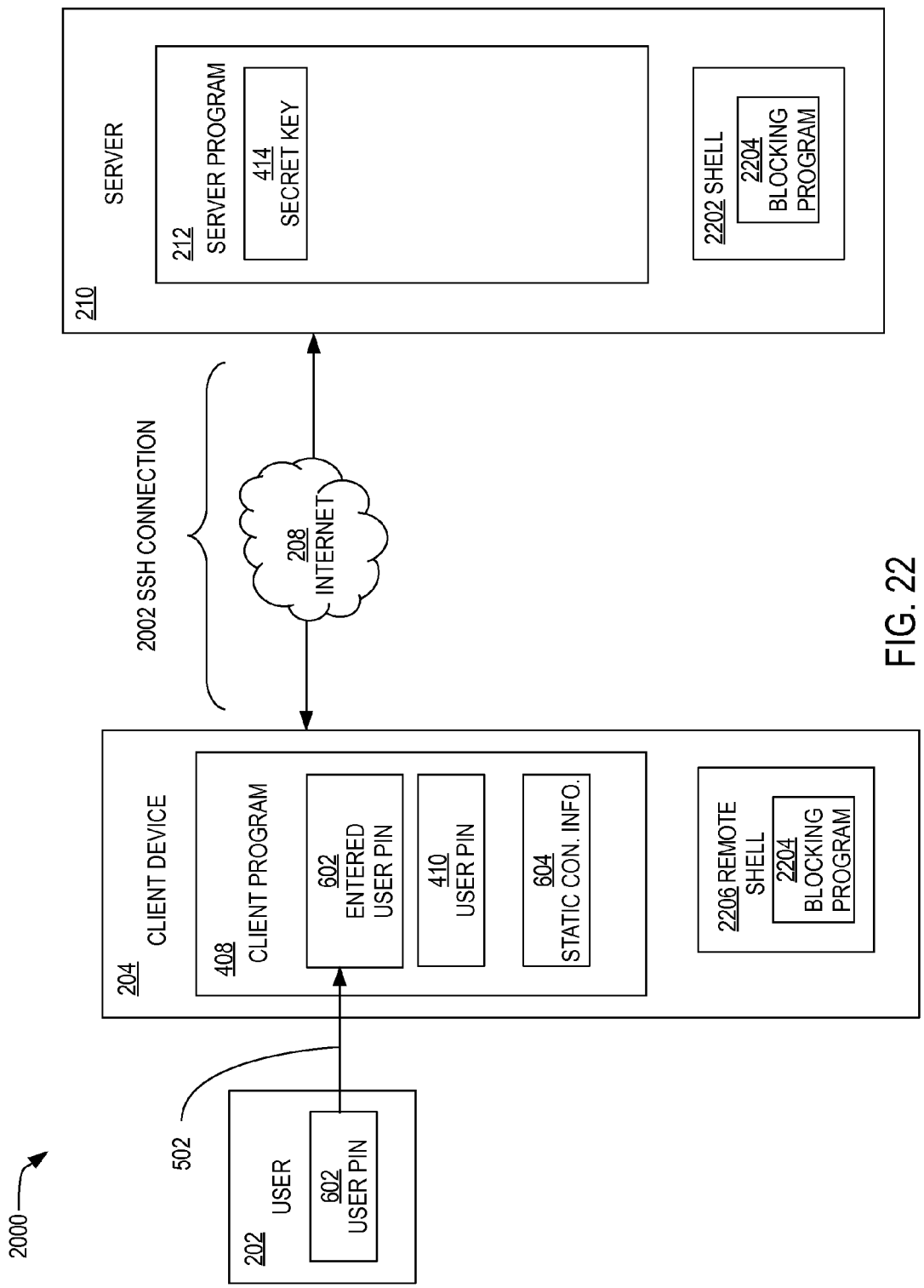
FIG. 22 shows a detailed block diagram of the system shown in FIG. 2 with elements referenced in the flowchart of FIG. 21.

FIG. 21 shows a flowchart of a method of the connection process 1904 in the flowchart shown in FIG. 19; and FIG. 22 shows a detailed block diagram of the system shown in FIG. 20 with elements referenced in the flowchart of FIG. 21.

First, the user 202 enters 2102 a PIN 602 into the client program 408. If the entered user PIN 602 and the client device ID 412 do not match their previously registered profiles, the stored encrypted secret key 416 is not decrypted and the connection process 1904 is stopped 2106. If the entered user PIN 602 and the client device ID 412 do match their previously registered profiles then the encrypted secret key 416 is decrypted, authenticating the user and device 102 and the connection process 1904 continues.

Next, the client program 408 establishes 2108 a secure shell connection 2002 from the client device 204 to the server computer 210. The server program 212 detects 2110 the secure shell connection 2002 and runs a blocking program 2204 in the secure shell 2202.

Figure 23:
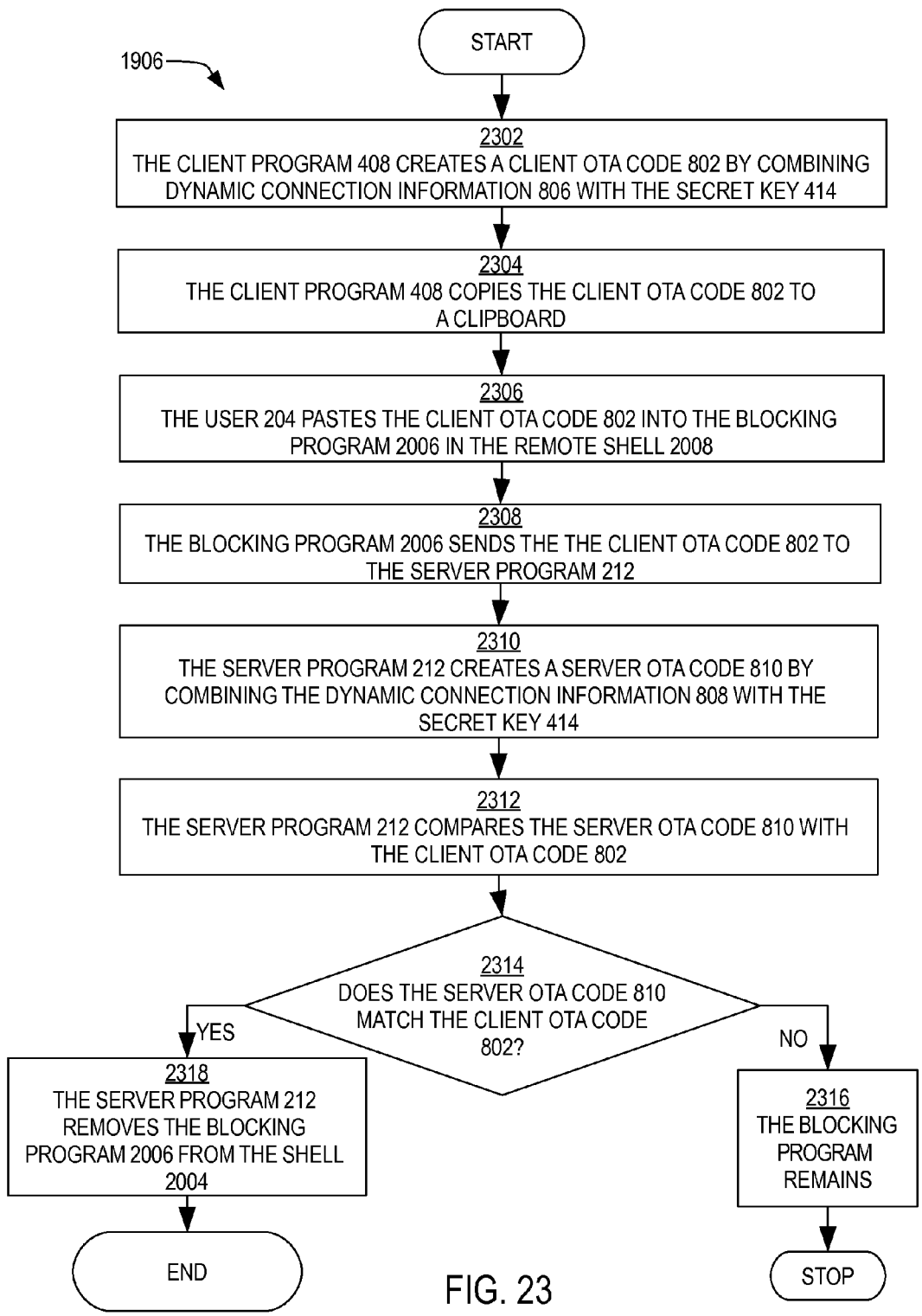
FIG. 23 shows a flowchart of a method of an authorization process in the flowchart shown in FIG. 19.
Figure 24:
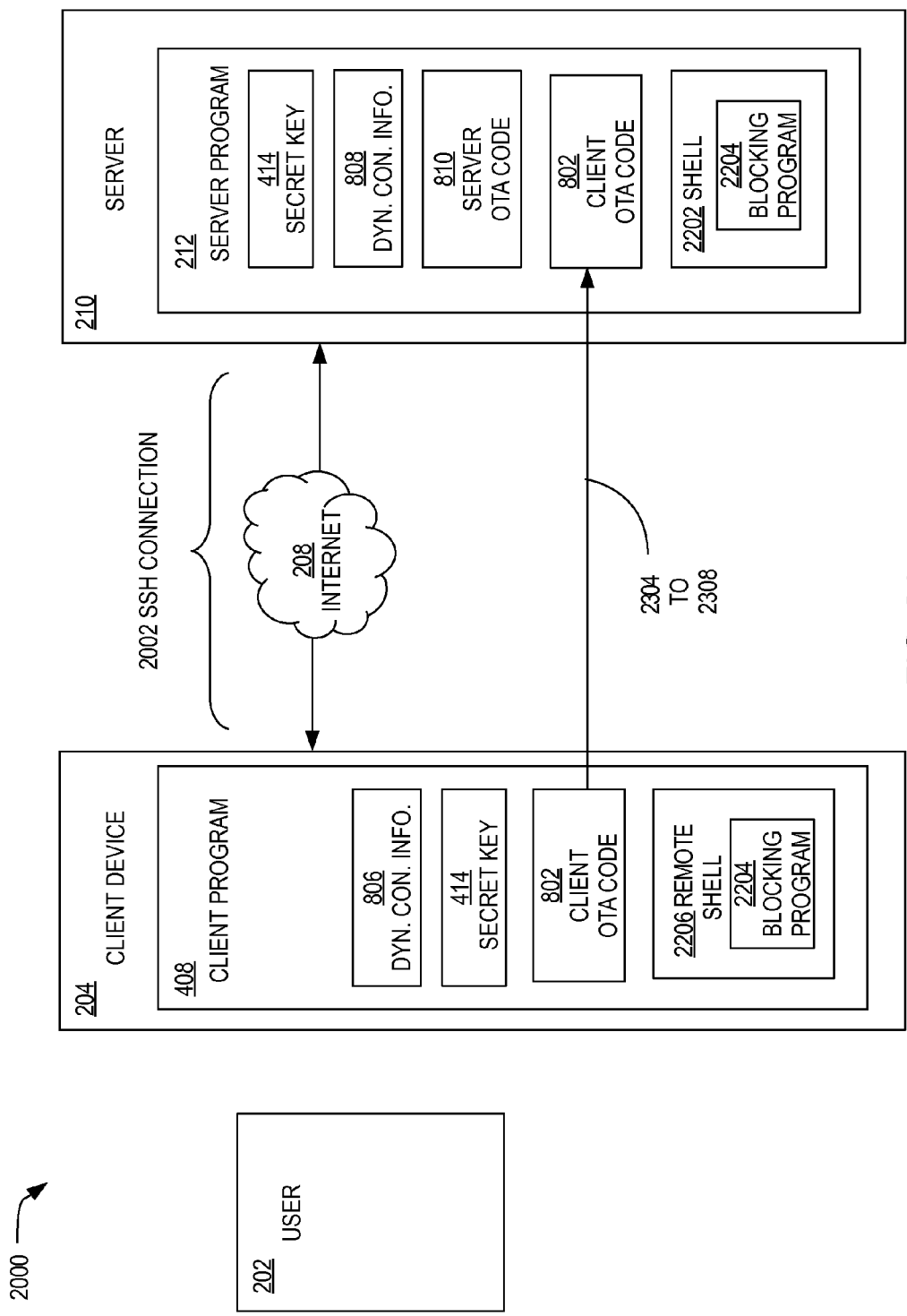
FIG. 24 shows a detailed block diagram of the system shown in FIG. 12 with elements referenced in the flowchart of FIG. 23.

FIG. 23 shows a flowchart of a method of an authorization process in the flowchart shown in FIG. 19; and FIG. 24 shows a detailed block diagram of the system shown in FIG. 20 with elements referenced in the flowchart of FIG. 23.

The authorization process for the third embodiment 1906 is substantially the same as the first embodiment 106 except that the server program 212 removes 2118 the blocking program 2204 from the secure shell 2202.

Figure 25:
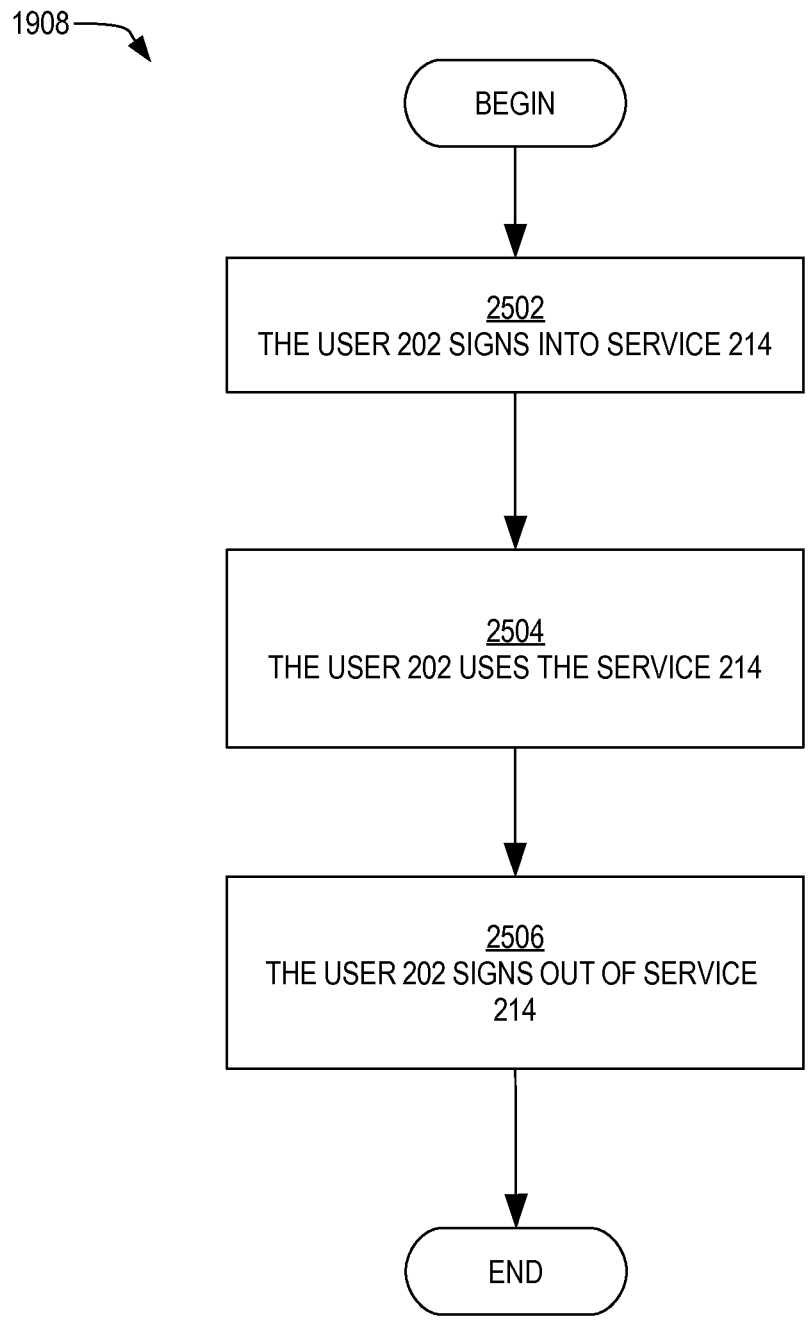
FIG. 25 shows a flowchart of a method of a Using Services process in the flowchart shown in FIG. 19.
Figure 26:
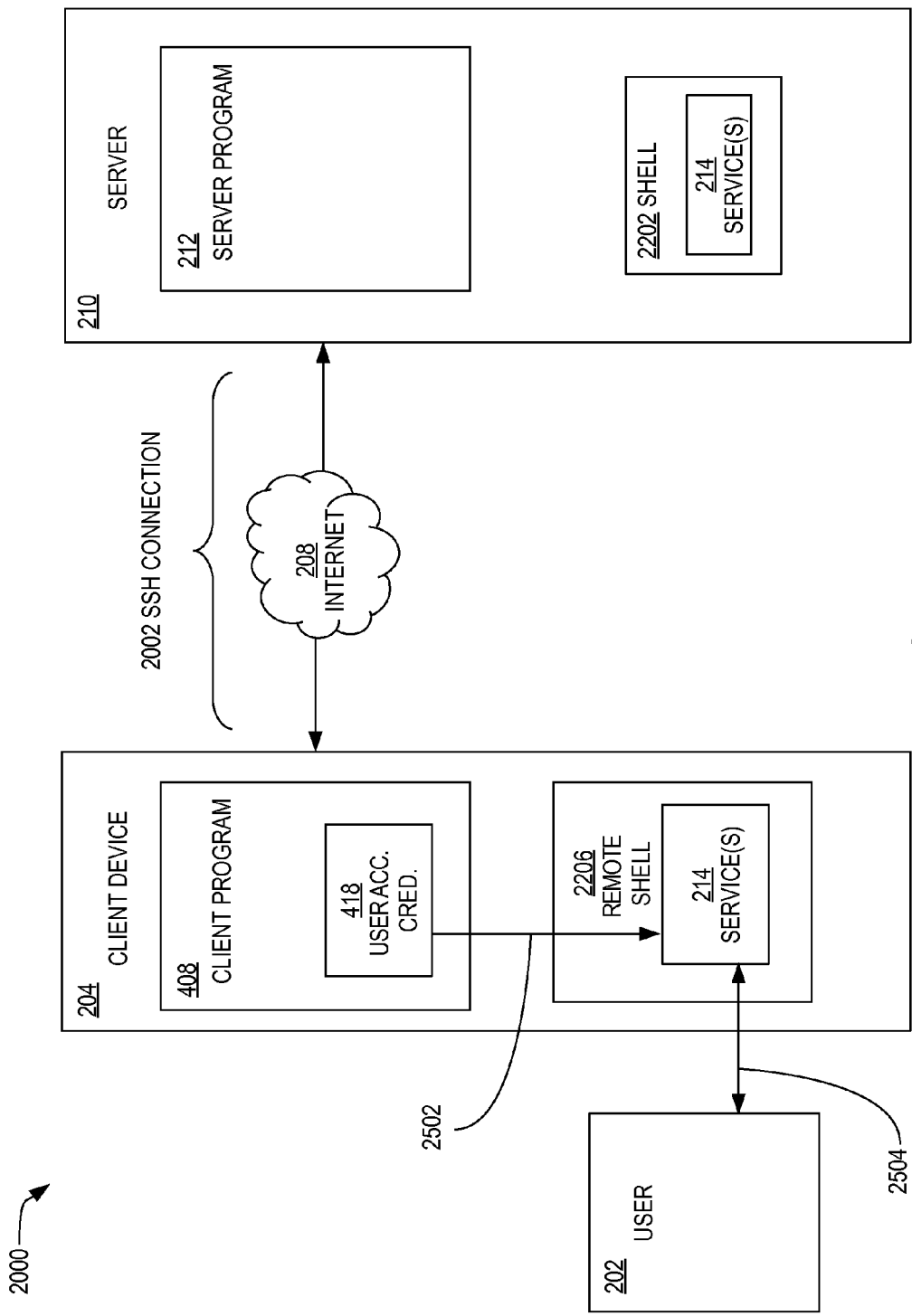
FIG. 26 shows a detailed block diagram of the system shown in FIG. 12 with elements referenced in the flowchart of FIG. 25.

FIG. 25 shows a flowchart of a method of the Using Services process in the flowchart shown in FIG. 19; and FIG. 26 shows a detailed block diagram of the system shown in FIG. 20 with elements referenced in the flowchart of FIG. 25. First, the user 202 signs into 2502 service 214 in the remote shell 2206. The user 202 uses 2504 the service 214. The user 202 signs out 2506 of service 214.

Figure 27A:
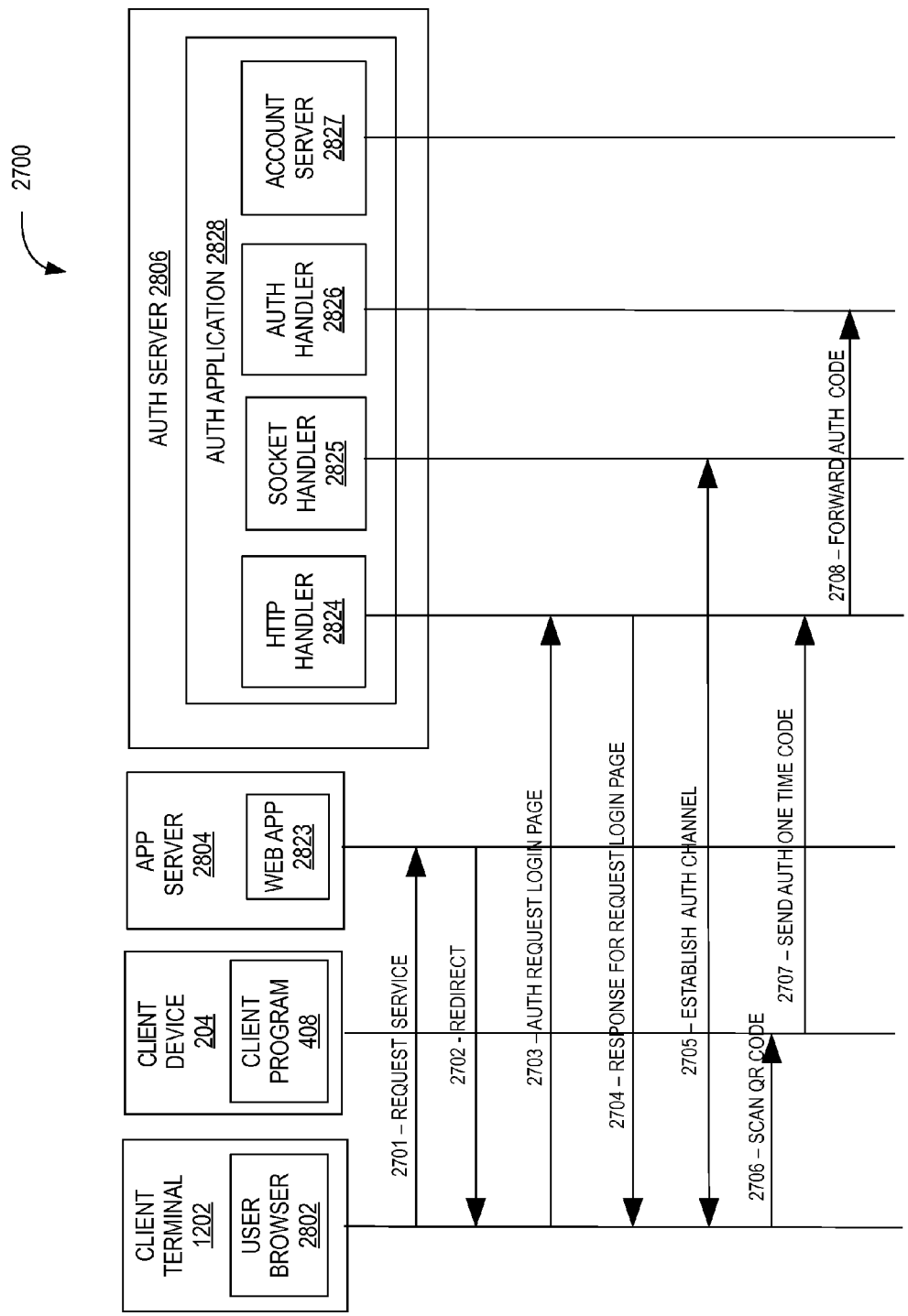
FIGS. 27A and 27B show an activity diagram in accordance with a fourth embodiment of the present invention.
Figure 27B:
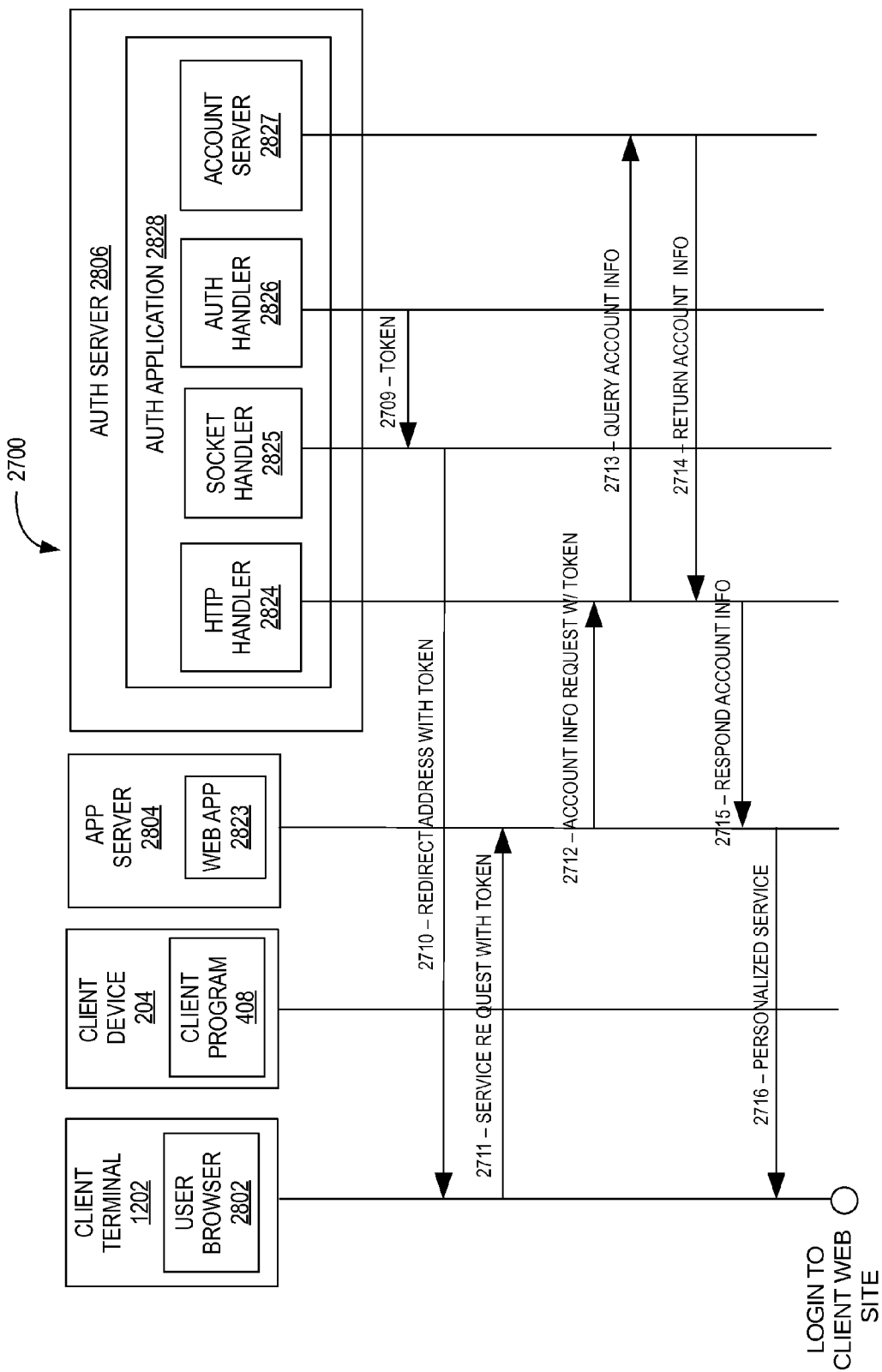
Figure 28A:
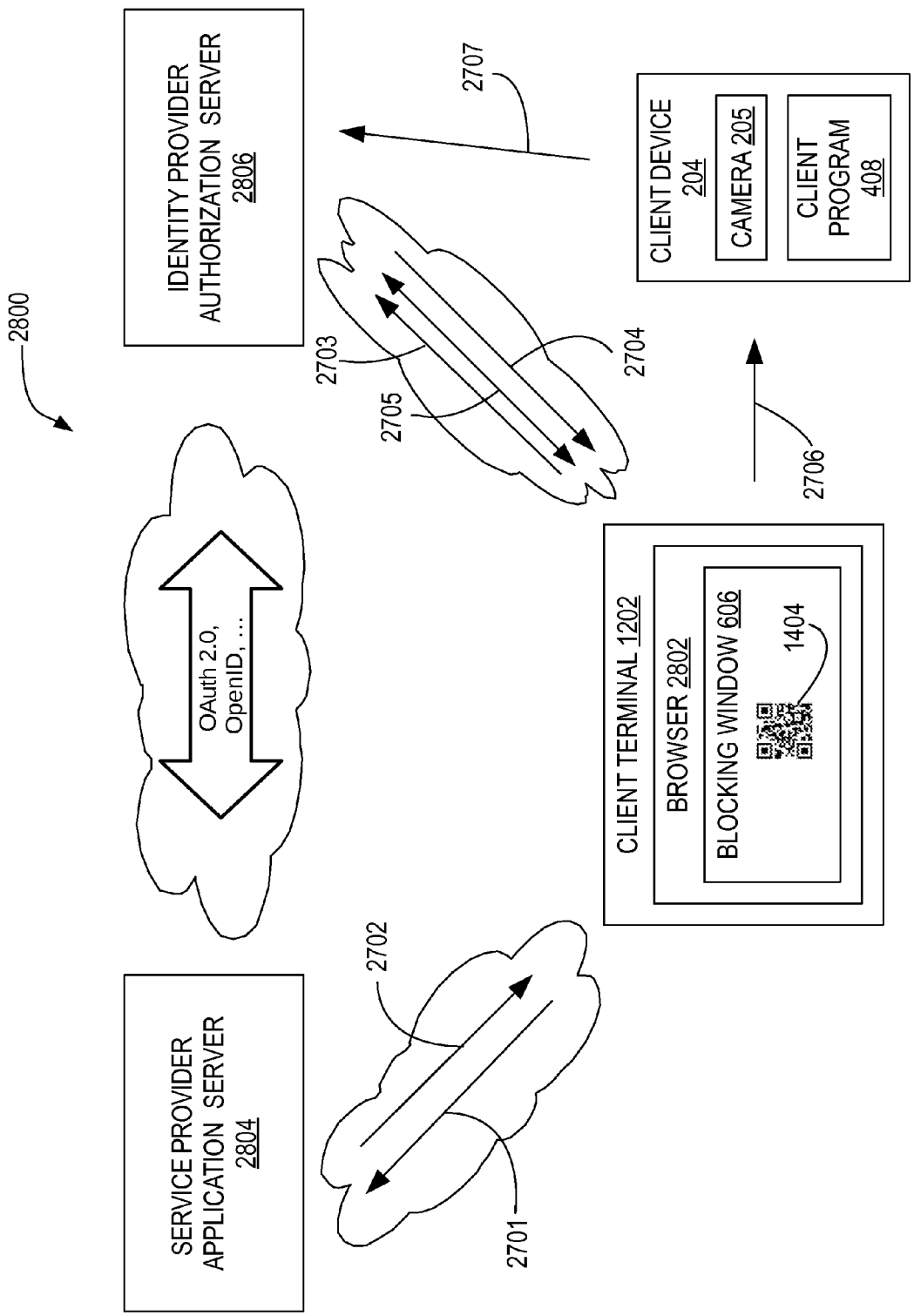
FIGS. 28A and 28B show an overview system diagram in accordance with the fourth embodiment of the present invention with elements referenced in the activity diagram of FIGS. 27A and 27B.
Figure 28B:
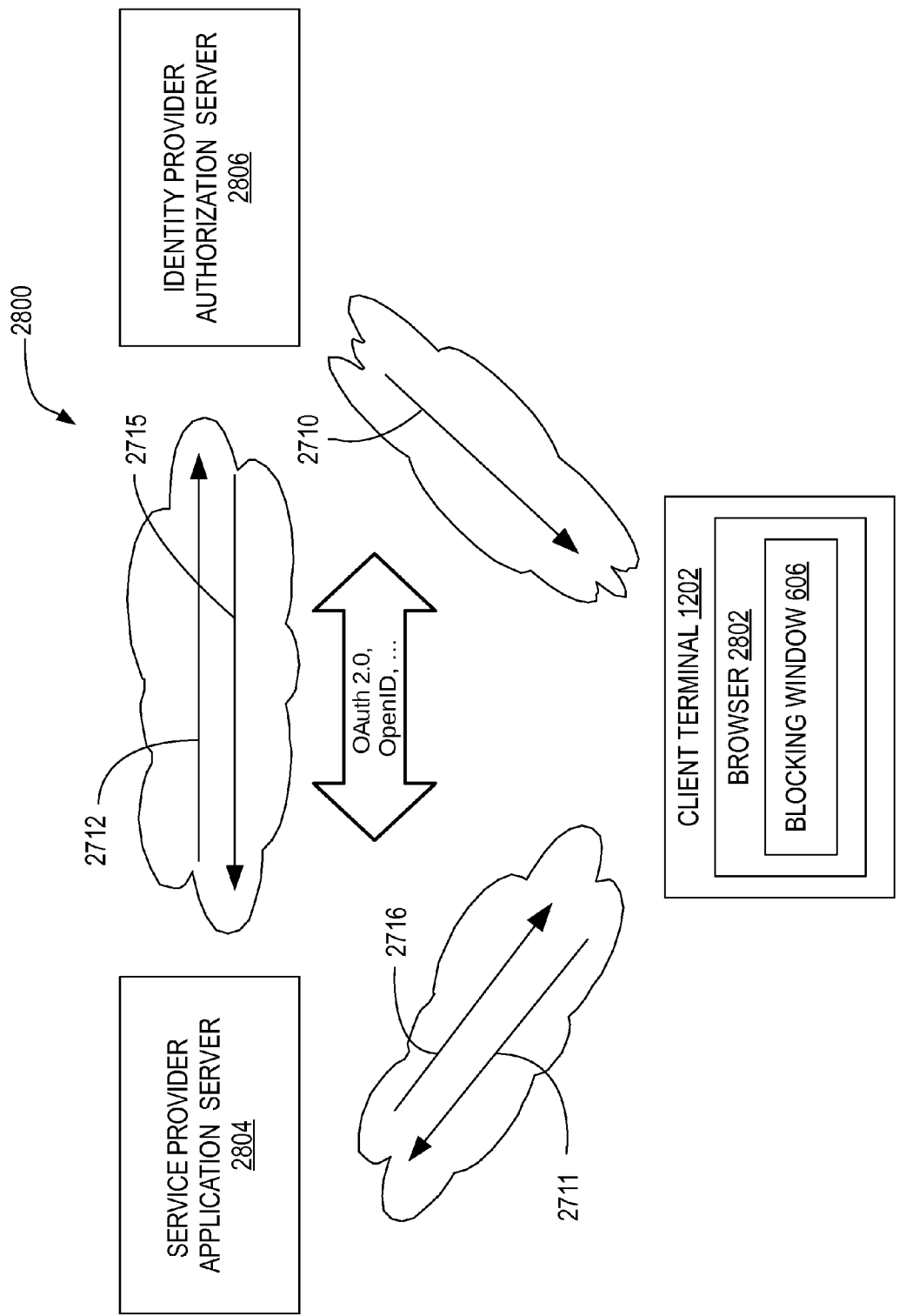

Referring to FIGS. 27A and B there is shown an activity diagram 2700 in accordance with a fourth embodiment of the present invention. FIGS. 28A and B show an overview system diagram in accordance with the fourth embodiment of the present invention with elements referenced in the activity diagram of FIGS. 27A and B.

The user browser 2802 is the terminal 1202 container that runs the desired applications for application users. Web pages for both the client web application 2823 and an authorization (auth) application 2828 executing on an authorization server computer 2806 are loaded and displayed to the user with the user browser 2802. The authorization server computer 2806 may be, for example, a third party server computer not owned or controlled by the same parties owning or controlling the application server 2804.

The client device 204 is a device owned by the user and is identical to the client device 204 described herein above with regard to the second embodiment (FIGS. 11 to 18). It has been authenticated by the auth application 2828 according to the process 102 described with regard to FIGS. 3A and 3B. The requests will be authorized if and only if the user sends the authorization request from an authenticated client device.

The client web application 2823 is a third-party web application that may not belong to the authorization service provider. It provides users with services they desire. However, they are not responsible for the account authorization. They subscribe the authorization service from the auth application 2828.

The HTTP handler 2824 is responsible for requests redirected to the auth application 2828. When the requests related to the authorization service arrives at the auth application 2828, the HTTP handler 2824 deals with them and sends proper responses. Meanwhile, it may interact with other modules of the auth application 2828.

The socket handler 2825 helps establish a secure channel other than the regular HTTP channel to transmit the authorization messages. It creates a socket server accepting TCP (Transport Control Protocol) or UDP (User Datagram Protocol) connections from the user browser 2802 sessions. Once the session is authorized by the auth handler 2826, the socket handler 2825 will send a message to the user browser 2802 to redirect the user back to the web application 2823.

The auth handler 2826 verifies if the authorization message is valid, that is, whether or not the message is sent from a client device 204. The authorization message should be forwarded from the HTTP handler 2824 which accepts the authorization requests. The authorization results issued by the auth handler 2826 should be sent back to the user browser 2802 via the secure socket channel.

The account server 2827 stores the account information for users. If the authorization passes, the corresponding account information will be pulled and sent back to the web application 2823.

The auth application 2828 is the combination of the HTTP handler 2824, the socket handler 2825, the auth handler 2826, and the account server 2827. They work together to provide an authorization service for the web application 2823.

In operation, the user browser 2802 accesses the web application 2823 and requests services 2701 from that application.

The web application 2823 redirects 2702 the user to the auth application 2828 to check the authorization status of the user. The HTTP handler 2824 will handle the redirected request.

If the auth application 2828 finds that the user has not been authorized, it responds by requesting 2703 the login page.

The login page is transmitted 2704 from the HTTP handler 2824 to the user browser 2802. It includes a QR code 1404 containing the dynamic connection information 804 as described herein above with regard to the first embodiment.

As soon as the user browser 2802 loads the login page, it establishes 2705 the other secure TCP or UDP socket connection with the socket handler 2825. This will be used as the dedicated channel for authorization messages. This will be used as the dedicated channel for notification of whether and when authorization is successful. The QR code 1404 is displayed in a blocking window 606. The blocking window 606 may be, for example, a browser tab, browser window, a floating dialog box, or the like.

The embedded camera 205 in client device 204 is used to scan 2706 the QR 1404 code and to read the session information and time stamp. This step 2706 is identical to step 1314 described herein above with regard to the second embodiment.

The authorization code is sent 2707 from the authorized device to the HTTP handler 2824 via the HTTP channel. The step 2707 is identical to step 1506 described herein above with regard to the second embodiment.

The authorization code will be forwarded 2708 to the auth handler 2826 after it has been received by the HTTP handler 2824 and identified as an authorization message.

After the auth handler 2826 verifies the authorization code, it passes 2709 the user-specific token to the socket handler 2825. That token is bond to the session trying to login.

The socket handler 2825 locates the session waiting for the authorization result, and then sends back the user's token with the URL redirecting 2710 the user to the web application 2823.

The user browser 2802 initiates another request 2711 for the services from the web application 2823. At this time, the user's token is attached to the request.

The web application 2823 receives the service request and tries to fetch information of the user account from the auth application 2828 with the token by sending 2712 the request to the HTTP handler 2824.

The HTTP handler 2824 queries 2713 the account information from the account server 2827.

The account information of the user bond to the token is returned 2714 to the HTTP handler 2824.

The HTTP handler 2824 encapsulates the account information of the user and responds 2715 to the web application 2823.

The web application 2823 provides 2716 personalized services to the user according to the account information.

Therefore embodiments of the present invention expand a shared environment between the client and the server elements, which require the following:

Separating the authentication process from the authorization process;

Reversing a conventional sequence of access and connection processes by establishing a connection first, so that dynamic connection link information can be used as an input for generating stronger, more secure OTA codes that are uniquely associated with the connection. This authorization process authorizes the user for a specific run-time connection that has been established, since the dynamic connection information forms part of the OTA code.

Embodiments of the present invention provide an improved authorization process for securely accessing local resources (such as desktop computers and laptop computers), remote computing services, such as data centers and various services based on cloud computing models, for example. Furthermore, embodiments of the present invention provide a real-time method for generating and verifying a One-Time Authorization (OTA) code. This method is based on the client program and server program sharing the static and dynamic information for generating and verifying OTA codes.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

Figure 3A:
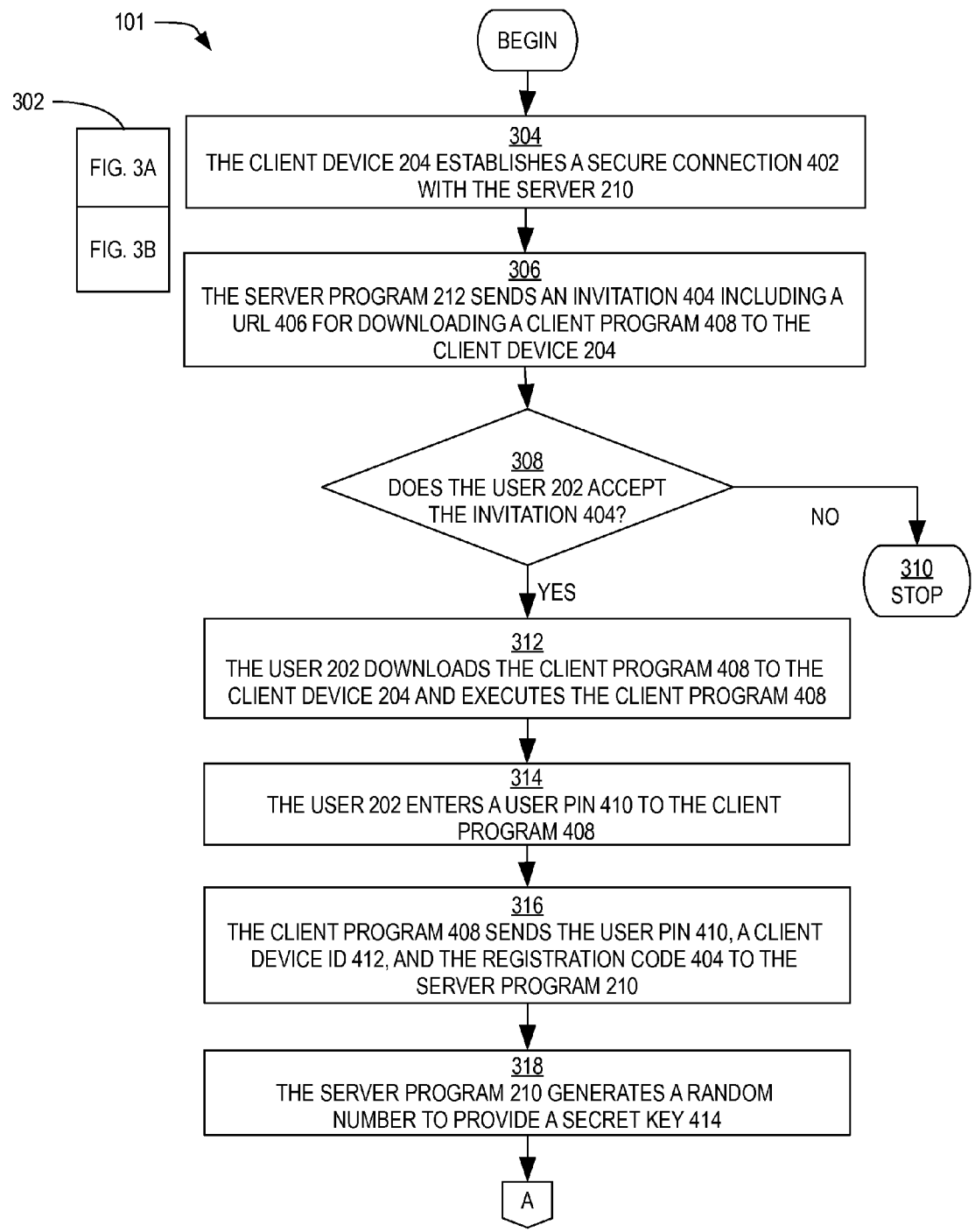
FIGS. 3A and 3B show a flowchart of a registration method for the user of a service to undergo to enable the authentication process and the authorization process in the flowchart shown in FIG. 1.
Figure 3B:
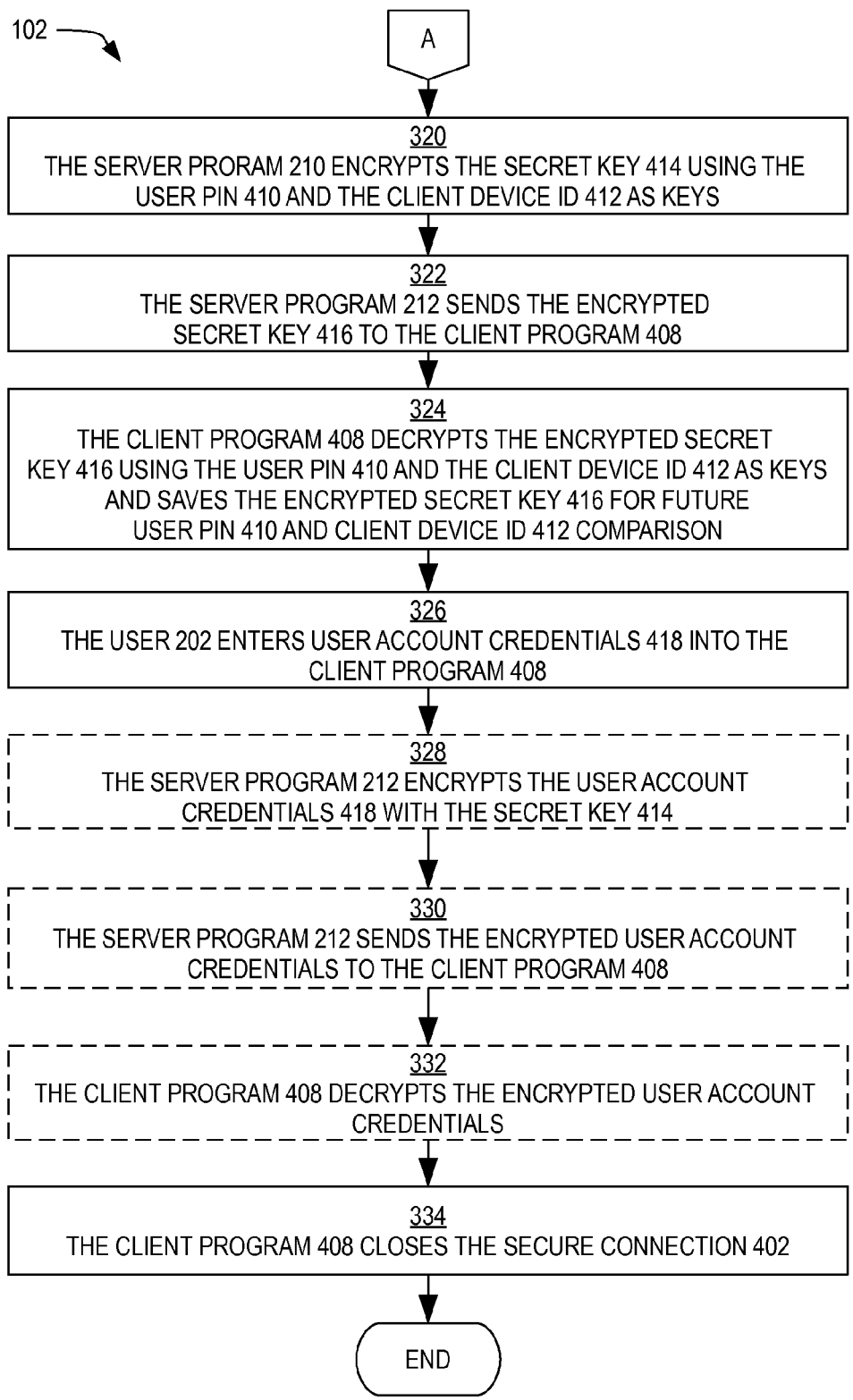

| TABLE OF ELEMENTS | |
|---|---|
| 100 | Flowchart of a first embodiment |
| 102 to 112 | Processes of flowchart 100 |
| 200 | System block diagram of the first embodiment |
| 202 | User |
| 204 | Client Device |
| 205 | Camera |
| 206 | RDP Connection |
| 208 | Internet |
| 210 | Server Computer |
| 212 | Server Program |
| 214 | Service(s) |
| 302 | Layout guide to FIGS. 3A and 3B |
| 304 to 324 | Processes of Authentication 102 shown in FIG. 1 |
| 402 | Secure Connection |
| 404 | Invitation |
| 406 | Download URL |
| 408 | Client Program |
| 409 | Authentication Software |
| 410 | Predetermined User Pin |
| 411 | Authorization Software |
| 412 | Static Client Device ID |

TABLE OF ELEMENTS

| | |
|---|---|
| 413 | Client device ID (copy) |
| 414 | Secret Key |
| 416 | Encrypted Secret Key |
| 418 | User Account Access Credentials |
| 502 to 510 | Processes of Connection 104 shown in FIG. 1 |
| 602 | Entered User PIN |
| 604 | Static Connection Information |
| 606 | Blocking Window |
| 608 | Server Desktop |
| 610 | Remote Desktop Window |
| 702 to 718 | Processes of Authorization 106 shown in FIG. 1 |
| 802 | Client OTA Code |
| 804 | Client Dynamic Connection Information |
| 806 | Shared Clipboard |
| 808 | Server Dynamic Connection Information |
| 810 | Server OTA Code |
| 902 to 906 | Processes of Using Services 108 shown in FIG. 1 |
| 1100 | Flowchart of a second embodiment |
| 102, 1104 to 1112 | Processes of flowchart 1100 |
| 1200 | System block diagram of the second embodiment |
| 1202 | Client terminal |
| 1302 to 1314 | Processes of connection 1104 shown in FIG. 11 |
| 1402 | QR code |
| 1502 to 1516 | Processes of authorization 1106 shown in FIG. 11 |
| 1602 | Authorization channel |
| 1702 to 1706 | Processes of Using Services 1108 shown in FIG. 11 |
| 1900 | Flowchart of a third embodiment |
| 102, 1904 to 1912 | Processes of flowchart 1900 |
| 2000 | System block diagram of the third embodiment |
| 2002 | Secure shell connection |
| 2102 to 2110 | Processes of connection 1904 shown in FIG. 19 |
| 2202 | Shell |
| 2204 | Blocking program |
| 2206 | Remote shell |
| 2302 to 2318 | Processes of authorization 1906 shown in FIG. 19 |
| 2502 to 2506 | Processes of using 1908 show in FIG. 19 |
| 2700 | Activity diagram of fourth embodiment |
| 2701 to 2716 | Process of authorizing application services |
| 2802 | User browser |
| 2804 | Application server computer |
| 2806 | Authorization server computer |

Thus, an improved system, method and apparatus for secure remote connection to computing services have been provided.

Although the embodiments of the invention have been described in detail, it will be apparent to one skilled in the art that variations and modifications to the embodiment may be made within the scope of the following claims.

What is claimed is:

1. A method for remotely accessing a service on a server computer, comprising:
   separating authentication and authorization processes, comprising excluding service access privileges from the authenticating process and transferring the privileges to the authorization process, comprising:
   (i) authenticating a client device; and
   (ii) upon successful authenticating of the client device, performing the authorization process, comprising:
      (ii-1) establishing an authorization connection between the client device and the server computer;
      (ii-2) at the server computer, detecting the authorization connection, and verifying the authorization connection; and
      (ii-3) upon successful verification of the authorization connection, allowing the access of the client device to the service on the server computer.

2. The method of claim 1, wherein:
   the step (ii-2) further comprises, upon detecting the authorization connection, creating a blocking process to block access of the client device to the service on the server computer; and
   the step (ii-3) further comprises, upon successful verification of the authorization connection, terminating the blocking process on the server computer, prior to the allowing the access of the client device to the service on the server computer.

3. The method of claim 2, wherein:
   the establishing the authorization connection further comprises establishing a remote desktop connection; and
   the creating the blocking process further comprises creating a blocking window on a desktop of the server computer.

4. The method of claim 3, wherein the creating the blocking window further comprises creating a modal dialog window.

5. The method of claim 2, wherein the creating the blocking process further comprises:
   providing a QR code (Quick Response code) including a dynamic connection information for the authorization connection in a blocking window on a client terminal; and
   at the client device, obtaining the dynamic connection information from the QR code.

6. The method of claim 1, further comprising:
   at the client device, obtaining from a remote network location, an authorization software and an input information to the authorization software; and
   wherein step (ii) further comprises:
      (ii-4) executing the authorization software on the client device and the remote network location with the obtained input information; and
      (ii-5) provided an output from the authorization software on the client device and the remote network location is the same, allowing the access to the service on the server computer.

7. The method of claim 6, wherein the remote network location is one of the following:
   the server computer; or
   another authentication and authorization server computer.

8. The method of claim 6, wherein the authorization software is configured to perform an OTA (One-Time-Authorization).

9. The method of claim 8, further comprising performing the OTA using a one-way function and a dynamic connection information for the authorization connection as an input to the one-way function.

10. The method of claim 6, further comprising one or more of the following:
    sharing an output from the authorization software on the client device and the server computer or a third party server computer via a shared clipboard; or
    sending the output from the authorization software on the client device to the server computer or the third party server computer via a secure channel; or
    copying the output from the authorization software on the client device to a clipboard, and pasting the output into a secure shell executing a blocking process to block access of the client device to the service on the server computer.

11. The method of claim 10, wherein the client device is one of the following:
    a computing device having a processor; or
    a portable device having a memory, the portable device being different from the computing device, and being operably coupled to the computing device.

12. The method of claim 1, wherein the step (i) further comprises:
    obtaining, from a remote network location, an authentication software, and causing the authentication software to obtain a user selectable PIN (Personal Identification Number), and a UID (unique identifier) of the client device;

forwarding the PIN, the UID and the authentication software to the remote network location for generating a user-personalized credential code using the PIN, the UID and the authentication software, comprising encrypting the user-personalized credential code;

at the client device, obtaining the user-personalized credential code from the remote network location, and verifying an authenticity of the user selectable PIN and the UID, without communicating over a network, comprising decrypting the user-personalized credential code; and retrieving access credentials to the remote network location upon verifying the authenticity of the user selectable PIN and the UID.

13. The method of claim 12, wherein the remote network location is one of the following:
the server computer; or
another authentication and authorization server computer.

14. The method of claim 12, wherein the authentication software is configured to perform an OTA (One-Time-Authorization).

15. The method of claim 1, further comprising:
automatically signing into the service in a remote desktop window on a client terminal using user account credentials; and
upon the user signing out of the service in the remote desktop window on the client terminal, closing the authorization connection on the server computer.

16. The method of claim 1, further comprising, upon successful verification, automatically forwarding access credentials for accessing the service on the server computer to a remote network location for authenticating with the remote network location.

17. The method of claim 16, wherein the access credentials comprise a one-time password, which is changed at each occasion when access to the service on the server computer is requested.

18. A system for remote access to a service on a server computer, comprising:
a client device having a processor;
a server computer; and
computer readable instructions stored in a memory of the client device and the server computer, causing the client device and the server computer to separate authentication and authorization processes, comprising excluding service access privileges from the authenticating process and transferring the privileges to the authorization process, comprising:
(i) authenticating the client device; and
(ii) upon successful authenticating of the client device, performing the authorization process, comprising:
(ii-1) establishing an authorization connection between the client device and the server computer;
(ii-2) at the server computer, detecting the authorization connection, and verifying the authorization connection; and
(ii-3) upon successful verification of the authorization connection, allowing the access of the client device to the service on the server computer.

19. The system of claim 18, wherein the computer readable instructions further cause, upon detecting the authorization connection, to create a blocking process to block access of the client device to the service on the server computer; and
upon successful verification of the authorization connection, to terminate the blocking process on the server computer, prior to the allowing the access of the client device to the service on the server computer.

20. The system of claim 19, wherein the computer readable instructions further cause:
to establish a remote desktop connection; and
to create a blocking window on a desktop of the server computer.

21. The system of claim 20, wherein the computer readable instructions further cause to create a modal dialog window.

22. The system of claim 19, wherein the computer readable instructions further cause:
to provide a QR code (Quick Response code) including a dynamic connection information for the authorization connection in a blocking window on a client terminal; and
at the client device, to obtain the dynamic connection information from the QR code.

23. The system of claim 18, wherein the computer readable instructions further cause:
at the client device, to obtain from a remote network location, an authorization software and an input information to the authorization software; and
(ii-4) to execute the authorization software on the client device and the remote network location with the obtained input information; and
(ii-5) provided an output from the authorization software on the client device and the remote network location is the same, to allow the access to the service on the server computer.

24. The system of claim 23, wherein the remote network location is one of the following:
the server computer; or
another authentication and authorization server computer.

25. The system of claim 23, wherein the authorization software is configured to perform an OTA (One-Time-Authorization).

26. The system of claim 25, wherein the computer readable instructions are further configured to perform the OTA using a one-way function and a dynamic connection information for the authorization connection as an input to the one-way function.

27. The system of claim 23, wherein the computer readable instructions further cause one or more of the following:
to share an output from the authorization software on the client device and the server computer or a third party server computer via a shared clipboard; or
to send the output from the authorization software on the client device to the server computer or the third party server computer via a secure channel; or
to copy the output from the authorization software on the client device to a clipboard, and to paste the output into a secure shell executing a blocking process to block access of the client device to the service on the server computer.

28. The system of claim 27, wherein the client device is one of the following:
a computing device having a processor; or
a portable device having a memory, the portable device being different from the computing device, and being operably coupled to the computing device.

29. The system of claim 18, wherein the computer readable instructions further cause:
to obtain, from a remote network location, an authentication software, and cause the authentication software to obtain a user selectable PIN (Personal Identification Number), and a UID (unique identifier) of the client device;

to forward the PIN, the UID and the authentication software to the remote network location for generating a user-personalized credential code using the PIN, the UID and the authentication software, comprising encrypting the user-personalized credential code;

at the client device, to obtain the user-personalized credential code from the remote network location, and verify an authenticity of the user selectable PIN and the UID, without communicating over a network, comprising decrypting the user-personalized credential code; and to retrieve access credentials to the remote network location upon verifying the authenticity of the user selectable PIN and the UID.

30. The system of claim 29, wherein the remote network location is one of the following:

the server computer; or another authentication and authorization server computer.

31. The system of claim 29, wherein the authentication software is configured to perform an OTA (One-Time-Authorization).

32. The system of claim 18, wherein the computer readable instructions further cause:

to automatically sign into the service in a remote desktop window on a client terminal using user account credentials;

upon the user signing out of the service in the remote desktop window on the client terminal, to close the authorization connection on the server computer.

33. The system of claim 18, wherein the computer readable instruction further cause, upon successful verification, to automatically forward access credentials for accessing the service on the server computer to a remote network location for authenticating with the remote network location.

34. The system of claim 33, wherein the access credentials comprise a one-time password, which is changed at each occasion when access to the service on the server computer is requested.

* * * * *